United States Patent
Koci

(10) Patent No.: US 11,901,841 B2
(45) Date of Patent: Feb. 13, 2024

(54) ELECTROADHESION DEVICE WITH VOLTAGE CONTROL MODULE

(71) Applicant: Selfie Snapper, Inc., Woodland Hills, CA (US)

(72) Inventor: Denis Koci, Sherman Oaks, CA (US)

(73) Assignee: Selfie Snapper, Inc., Woodland Hills, CA (US)

(*) Notice: Subject to any disclaimer, the term of this patent is extended or adjusted under 35 U.S.C. 154(b) by 0 days.

(21) Appl. No.: 18/080,589

(22) Filed: Dec. 13, 2022

(65) Prior Publication Data
US 2023/0111007 A1    Apr. 13, 2023

Related U.S. Application Data

(63) Continuation of application No. 17/139,768, filed on Dec. 31, 2020.

(60) Provisional application No. 63/115,527, filed on Nov. 18, 2020, provisional application No. 63/094,547, filed on Oct. 21, 2020, provisional application No. 62/956,054, filed on Dec. 31, 2019.

(51) Int. Cl.
*B25J 9/16* (2006.01)
*H02N 13/00* (2006.01)

(52) U.S. Cl.
CPC .................... *H02N 13/00* (2013.01)

(58) Field of Classification Search
CPC ................ H04M 1/185; H04M 1/04
See application file for complete search history.

(56) References Cited

U.S. PATENT DOCUMENTS

| | | | |
|---|---|---|---|
| 7,551,419 | B2 | 6/2009 | Pelrine et al. |
| 7,554,787 | B2 | 6/2009 | Pelrine et al. |
| 7,684,694 | B2 | 3/2010 | Fromm |

(Continued)

FOREIGN PATENT DOCUMENTS

| | | |
|---|---|---|
| CN | 203889500 U | 10/2014 |
| EP | 2033216 A2 | 3/2009 |

(Continued)

OTHER PUBLICATIONS

Guo J., et al., "Electroadhesion Technologies for Robotics: A Comprehensive Review," IEEE Transactions on Robotics, Apr. 2020, vol. 36, No. 2, DOI:10.1109/TRO.2019.2956869, XP011781873, [Retrieved on Aug. 21, 2021] Retrieved from URL: https://ieeexplore.ieee.org/document/8946902.

(Continued)

*Primary Examiner* — Muhammad S Islam
(74) *Attorney, Agent, or Firm* — DLA PIPER LLP (US)

(57) ABSTRACT

Disclosed embodiments include electroadhesion devices for securing smartphones and other consumer devices to target surfaces. In various embodiments, the electroadhesion device may include a digital switch for adjusting the output voltage generated by a voltage converter. The digital switch may enable safe operation of the electroadhesion device by ensuring the output voltage generated by the voltage converter is compatible with the target surface. To determine a compatible output voltage, the electroadhesion device may include one or more sensors that may measure one or more characteristics of the target surface including conductivity, porosity, hardness, smoothness, and the like.

20 Claims, 10 Drawing Sheets

(56) References Cited

U.S. PATENT DOCUMENTS

| | | |
|---|---|---|
| 7,773,363 B2 | 8/2010 | Pelrine et al. |
| 7,872,850 B2 | 1/2011 | Pelrine et al. |
| 8,111,500 B2 | 2/2012 | Pelrine et al. |
| 8,125,758 B2 | 2/2012 | Pelrine et al. |
| 8,325,458 B2 | 12/2012 | Prahlad et al. |
| D692,473 S | 10/2013 | Kawaguchi et al. |
| 8,564,926 B2 | 10/2013 | Prahlad et al. |
| D697,122 S | 1/2014 | Ikegame |
| 8,665,578 B2 | 3/2014 | Pelrine et al. |
| 8,861,171 B2 | 10/2014 | Prahlad et al. |
| 8,982,531 B2 | 3/2015 | Prahlad et al. |
| 9,401,668 B2 | 7/2016 | Prahlad et al. |
| D779,577 S | 2/2017 | Ikegame |
| D781,363 S | 3/2017 | Ikegame |
| D797,836 S | 9/2017 | Li |
| 9,769,332 B1 | 9/2017 | Delaunay et al. |
| D848,512 S | 5/2019 | Kamei |
| D849,077 S | 5/2019 | Tian |
| D876,518 S | 2/2020 | Tran et al. |
| D887,478 S | 6/2020 | Brickner et al. |
| D894,994 S | 9/2020 | Yu |
| D906,399 S | 12/2020 | Wang |
| D908,765 S | 1/2021 | Wang |
| D916,166 S | 4/2021 | Li |
| D939,607 S | 12/2021 | Koci |
| 2006/0010454 A1 | 1/2006 | Napoli et al. |
| 2007/0074115 A1 | 3/2007 | Patten et al. |
| 2007/0081094 A1 | 4/2007 | Ciudad et al. |
| 2007/0254640 A1 | 11/2007 | Bliss |
| 2008/0037971 A1 | 2/2008 | Takami et al. |
| 2008/0089002 A1 | 4/2008 | Pelrine et al. |
| 2009/0065348 A1 | 3/2009 | Fujii |
| 2010/0249553 A1 | 9/2010 | Maclaughlin |
| 2011/0193362 A1 | 8/2011 | Prahlad et al. |
| 2012/0062691 A1 | 3/2012 | Fowler et al. |
| 2012/0120544 A1 | 5/2012 | Pelrine et al. |
| 2013/0242455 A1 | 9/2013 | Prahlad et al. |
| 2013/0292303 A1 | 11/2013 | Prahlad et al. |
| 2013/0294875 A1* | 11/2013 | Prahlad ............... B65G 17/46 414/730 |
| 2014/0009861 A1 | 1/2014 | Tatsumi et al. |
| 2014/0036404 A1 | 2/2014 | Prahlad et al. |
| 2014/0108552 A1 | 4/2014 | Singh et al. |
| 2014/0133062 A1 | 5/2014 | Prahlad et al. |
| 2015/0138595 A1 | 5/2015 | Sugimoto |
| 2016/0041628 A1 | 2/2016 | Verma |
| 2016/0100034 A1 | 4/2016 | Miller |
| 2017/0031235 A1 | 2/2017 | Kubotera et al. |
| 2017/0068149 A1 | 3/2017 | Fromm |
| 2017/0072407 A1 | 3/2017 | Prahlad et al. |
| 2017/0291806 A1 | 10/2017 | Lessing et al. |
| 2017/0331952 A1 | 11/2017 | Rogers et al. |
| 2017/0372525 A1 | 12/2017 | Rosenthal et al. |
| 2018/0054595 A1 | 2/2018 | Odamaki et al. |
| 2018/0137523 A1 | 5/2018 | Kim et al. |
| 2018/0350148 A1 | 12/2018 | George |
| 2018/0356711 A1 | 12/2018 | Otsuka et al. |
| 2019/0047157 A1 | 2/2019 | Shintake et al. |
| 2019/0075922 A1 | 3/2019 | Rivera et al. |
| 2019/0098190 A1 | 3/2019 | Hosoe |
| 2019/0158136 A1 | 5/2019 | DiLella |
| 2019/0172743 A1 | 6/2019 | McIntyre et al. |
| 2020/0338731 A1* | 10/2020 | Lynders ............... F16M 11/18 |
| 2021/0006181 A1 | 1/2021 | Koci |
| 2021/0006706 A1 | 1/2021 | Koci |
| 2021/0008416 A1 | 1/2021 | DeCarlo |
| 2021/0203245 A1 | 7/2021 | Koci |
| 2021/0386219 A1 | 12/2021 | Koci |
| 2021/0387347 A1 | 12/2021 | Koci |
| 2022/0009086 A1 | 1/2022 | Verma |
| 2022/0174205 A1 | 6/2022 | Koci |

FOREIGN PATENT DOCUMENTS

| | | |
|---|---|---|
| EP | 2041784 A2 | 4/2009 |
| EP | 2533951 A1 | 12/2012 |
| EP | 2548299 A2 | 1/2013 |
| EP | 2844592 A2 | 3/2015 |
| EP | 3056016 A1 | 8/2016 |
| EP | 3086016 A1 | 10/2016 |
| EP | 2041784 B1 | 10/2017 |
| EP | 2033216 B1 | 12/2020 |
| JP | 2009262860 A | 11/2009 |
| JP | 5038405 B2 | 10/2012 |
| JP | 5329398 B2 | 10/2013 |
| JP | 5832386 B2 | 12/2015 |
| JP | 5883430 B2 | 3/2016 |
| JP | 5940028 B2 | 6/2016 |
| JP | 6423200 B2 | 11/2018 |
| KR | 20160131821 A | 11/2016 |
| WO | 2007143662 A2 | 12/2007 |
| WO | 2008070201 A2 | 6/2008 |
| WO | 2011100028 A1 | 8/2011 |
| WO | 2011116357 A2 | 9/2011 |
| WO | 2012150028 A1 | 11/2012 |
| WO | 2013166329 A2 | 11/2013 |

OTHER PUBLICATIONS

Savioli et al., "Morphing Electroadhesive Interface to Manipulate Uncooperative Objects," Proceedings of the SPIE, vol. 9061, id. 906129, Publication date Mar. 2014, 14 pages.

Extended European Search Report for Application No. 20837304.3, dated Oct. 4, 2023, 13 Pages.

* cited by examiner

ELECTROADHESION DEVICE WITH VOLTAGE CONTROL MODULE

CROSS REFERENCE TO RELATED APPLICATIONS

This application is a Continuation patent application of U.S. patent application Ser. No. 17/139,768, titled "ELECTROADHESION DEVICE WITH HIGH VOLTAGE CONTROL MODULE," and filed, Dec. 31, 2020, which claims the benefit of U.S. Provisional Application Ser. No. 62/956,054 filed Dec. 31, 2019; U.S. Provisional Application Ser. No. 63/094,547 filed Oct. 21, 2020; and U.S. Provisional Application Ser. No. 63/115,527 filed Nov. 18, 2020, the entirety of which are incorporated by reference herein.

FIELD

The present disclosure relates generally to mounting and securing consumer objects using electroadhesion. In particular, electroadhesion devices including a voltage control module for safely mounting consumer devices to target surfaces.

BACKGROUND

Mounting consumer devices to walls, furniture, trees, mirrors, windows, and other target surfaces can optimize existing device functions and provide new functionality. Once mounted, users of consumer devices including smartphones, tablets, cameras, streaming media players, and the like can easily view content and take pictures with others. Securely mounting a device also enables using the device without holding it and while multitasking. Additionally, secure mounting mechanisms minimize the instances where consumer devices are damaged or broken from falling from an unsecured location. There is therefore a need to develop a device holder that secures the device to a location, allows devices to be used hands free, and facilitates group interactions with devices.

Previous attempts have been made to solve problems with mounting and securing consumer devices to target surfaces, but mechanical mounting mechanisms are unreliable and bulky. Mechanical mounting mechanisms also require time and effort to assemble and attach to a consumer device. Sometimes consumer devices can be damaged while attaching a mounting mechanism because screws, clamps, clips, and other components of the mounting mechanism can forcefully contact a screen or other fragile component of a consumer device and scratch, break, dent, or otherwise damage the consumer device. Many mechanical mounting systems must be permanently or semi-permanently attached to a target surface. When a consumer device is not attached to the mounting system or removed from the mounting system, the mounting system is exposed and looks ugly. Mechanical mounting systems may also damage the target surface they are fixed to during attachment and if the target surface fails to support the weight of the mounting system and/or consumer device.

Electroadhesion is a new technology that uses an applied voltage to establish an attachment between two surfaces. The voltage used to generate the electroadhesive attachment does not damage either surface. The voltage for electroadhesion can be generated instantaneously for attachment to the surface and rapidly dissipated for removal from the surface. The amount of voltage required for electroadhesion varies depending on the characteristics of the target surface to which the device is going to be attached. Attaching the device to some target surfaces requires a very high voltage.

Therefore, to be used safely and effectively, the voltage output for electroadhesion must be adjustable based on the characteristics of the target surface to which the device is going to be attached. For example, applying a high voltage to a conductive surface can cause sparks, fires, electric shock and other safety hazards. To make an electroadhesion device safe for consumers, the voltage level must be adjustable to reduce the voltage when attaching the device to conductive surfaces. Applying a low voltage to an insulating and/or porous surface will not generate sufficient electroadhesive force for attachment. To make an electroadhesion device effective on a wide variety of target surfaces, the voltage level must be adjustable to increase the voltage when attaching the device to insulating and/or porous surfaces. Furthermore, to make a consumer product that is certified safe by a testing lab, it is imperative to be able to precisely control the electroadhesion voltage and prevent the safety hazards. Therefore, it is desirable to have an electroadhesion device for mounting consumer devices that has a mechanism for adjusting the output voltage so that the electroadhesion device is safe for consumer use.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION OF ONE OR MORE EMBODIMENTS

As used herein, the terms "device", "devices", or "consumer device" refers to any object having an electrical component including smartphones, phones, computers, laptops, televisions, cameras, and the like or any other device used by a consumer that needs to safely mount or adhere to a surface using electroadhesion material.

As used herein, the terms "a piece of content" and "pieces of content" refer to images, videos, audio records, and other audiovisual works capable of being captured by—and viewed on—a consumer device.

As used herein, the terms "target surface" and "target surfaces" refer to walls, furniture, trees, mirrors, windows, and any other object and/or surface with an exposed area to attach a consumer device of any size. Target surfaces may be dielectric materials. Target surfaces may be rough or smooth and target surfaces comprised of one or more conductive and/or non-conductive materials.

As used herein, the terms "control circuit", "sensor control circuit", "camera control circuit", and "power management integrated circuit" refer to a microcontroller or other integrated circuit including programmable logic for controlling one or more functions of one or more components of the electroadhesion device.

EXEMPLARY EMBODIMENTS OF THE SYSTEM

Figure 1:
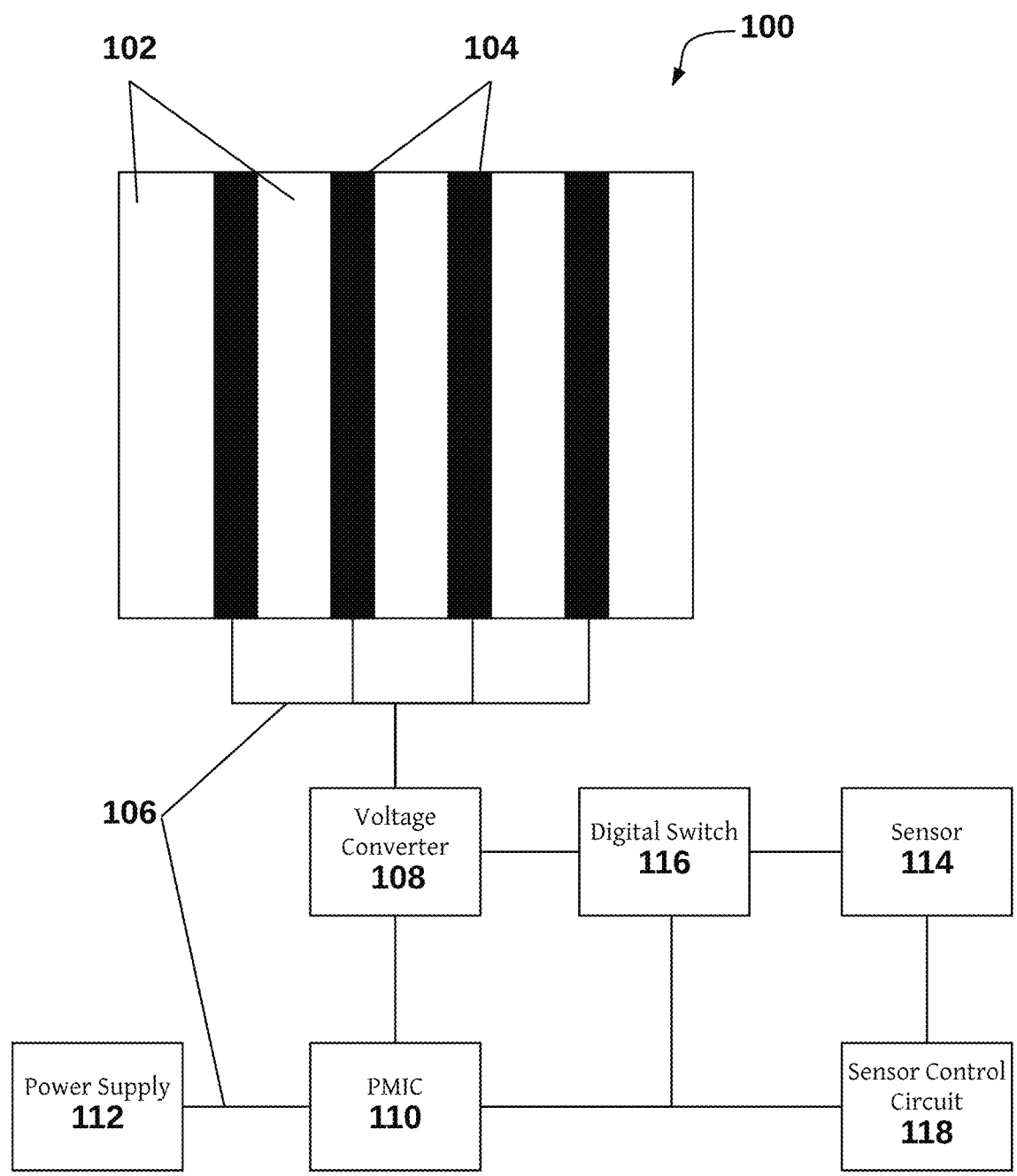
FIG. 1 illustrates an exemplary electroadhesion device for holding a consumer device.

FIG. 1 illustrates an exemplary electroadhesion device 100 that can safely be used with a consumer device. The electroadhesion device 100 may be incorporated into a device case, a device holder, or directly into the consumer device for securing the device to a target surface. The electroadhesion device 100 may also be removably attached and/or built into the back of a device to enable quick and secure attachment to a variety of surfaces. Attaching a device to a target surface using the electroadhesion device 100 allows multiple people to interact with the device, enables the device to be used hands free, and secures the device to a location to prevent the device from falling, being misplaced, and getting damaged.

The electroadhesion device 100 can be implemented as a layer (e.g., a compliant or rigid film) comprising one or more electrodes 104 and an insulating material 102. The insulating material 102 may be positioned between the one or more electrodes 104. The insulating material 102 may also be positioned between the electrodes 104 and a case, consumer device, and/or holder integrated with the electroadhesion device 100. The electroadhesive layer may include a chemical adhesive applied to the insulating material 102 and/or electrodes 104 to allow the electroadhesion device 100 to be attached to a case and/or consumer device. Additional attachment mechanisms used to secure the electroadhesion device 100 to a case and/or consumer device can include a mechanical fastener, a heat fastener (e.g., welded, spot welded, or spot-melted location), dry adhesion, Velcro, suction/vacuum adhesion, magnetic or electromagnetic attachment, tape (e.g.: single- or double-sided), and the like. Depending on the degree of device portability desired or needed for a given situation and the size of the electroadhesion device 100, the attachment mechanism may create a permanent, temporary, or removable form of attachment.

The insulating material 102 may be comprised of several different layers of insulators. For purposes of illustration, the electroadhesion device 100 is shown as having four electrodes 104 in two pairs, although it will be readily appreciated that more or fewer electrodes 104 can be used in a given electroadhesion device 100. Where only a single electrode 104 is used in a given electroadhesion device 100, a complimentary electroadhesion device 100 having at least one electrode of the opposite polarity is preferably used therewith. With respect to size, electroadhesion device 100 is substantially scale invariant. That is, electroadhesion device 100 sizes may range from less than 1 square centimeter to greater than several meters in surface area. Even larger and smaller surface areas are also possible and may be sized to the needs of a given device.

In various embodiments, the electroadhesion device 100 may cover the entire rear surface of a device. One or more electrodes 104 may be connected to a power supply 112 (e.g., battery, AC power supply, DC, power supply and the like) using one or more known electrical connections 106. A power management integrated circuit 110 may manage power supply 112 output, regulate voltage, and control power supply 112 charging functions. To create an electrostatic force to support a device, a voltage from the power supply 112 can be converted into high voltages that are applied at the one or more electrodes 104 using a voltage converter 108. The high voltages on the one or more electrodes 104 form an electric field that interacts with a target surface in contact with—and/or proximate to—the electroadhesion device 100. The electric field may locally polarize the target surface and/or induce electric charges on the target surface that are opposite to the charge on the one or more electrodes 104. The opposite charges on the one or more electrodes 104 and the target surface attract to cause electrostatic adhesion between the electrodes 104 and the target surface. The induced charges may be the result of a dielectric polarization or from weakly conductive materials and electrostatic induction of charge. In the event that the target surface comprises a material that is a strong conductor, such as copper for example, the induced charges may completely cancel the electric field. In this case, the internal electric field is zero, but the induced charges nonetheless still form and provide electrostatic force (i.e., Lorentz forces) to the electroadhesion device 100.

Thus, the electrostatic adhesion voltage applied to the one or more electrodes 104 provides an overall electrostatic force between the electroadhesion device 100 and the material of the target surface. The electrostatic force holds the electroadhesion device 100 on the target surface. The overall electrostatic force may be sufficient to overcome the gravitational pull on the electroadhesion device 100 and a consumer device or other object attached to the electroadhesion device 100. Therefore, the electrostatic force may be used to hold a consumer device mounted with the electroadhesion device 100 aloft on the target surface.

The strength of the electrostatic force may also be increased by ionizing the target surface to create more charged particles in proximity to the electroadhesion device 100. For example, ionizing the target surface may induce an electrical charge on particles located in the areas of the target surface and surrounding environment that are not in contact with or in close proximity to the electroadhesion device 100. The charged particles from more distant areas of the target surface and the surrounding environment may interact with the electric field created by the one or more electrodes 104 to increase the magnitude of the electrostatic force generated by the electroadhesion device 100 thereby strengthening the attachment between the electroadhesion device 100 and the target surface.

In various embodiments, a plurality of electroadhesion devices may be placed against target surface, such that additional electrostatic forces against the target surface can be provided. The combination of electrostatic forces may be sufficient to lift, move, pick and place, mount, or secure a large object on the target surface.

Removal of the electrostatic adhesion voltages from the one or more electrodes 104 ceases the electrostatic adhesion force between electroadhesion device 100 and the target surface. Thus, when there is no electrostatic adhesion voltage between the one or more electrodes 104, the electroadhesion device 100 can move more readily relative to the target surface. This condition allows the electroadhesion device 100 to move before and after an electrostatic adhesion voltage is applied. Well controlled electrical activation and de-activation enables fast adhesion and detachment, such as response times less than about 50 milliseconds, for example, while consuming relatively small amounts of power.

Applying too much voltage to certain materials (e.g., metals and other conductors) can cause sparks, fires, electric shocks, and other hazards. Applying too little voltage generates a weak electroadhesive force that is not strong enough to securely attach the electrostatic device 100 to the target surface. To ensure the proper adjustable voltage is generated and applied to the electrodes 104, a digital switch 116 may autonomously control the voltage converter 108. The digital switch 116 may be implemented as, for example, a controller including a digital and or analog switch. The digital switch 116 may control the voltage output to the one or more electrodes 104 by the voltage converter 108 based on sensor data collected by one or more sensors 114 included in the electroadhesion device 100. For example, the digital switch 116 may control the voltage output to the one or more electrodes 104 based on surface sensor data and or characteristics of a target surface based on surface sensor data measured by a surface sensor. The digital switch 116 may be a microcontroller or other integrated circuit including programmable logic for receiving sensor data, determining one or more characteristics based on the sensor data, and controlling the voltage converter based on the one or more characteristics. The digital switch 116 may operate the voltage converter to generate, modify, set, and/or maintain an adjustable output voltage used to attach the electroadhesion device 100 to a target surface.

For example, in response to detecting a conductive target surface (e.g., metal) by the sensor 114, the digital switch 116 may cause the voltage converter 108 to generate an adjustable voltage sufficient to attach and secure the electroadhesion device 100 to the conductive target surface. The adjustable voltage output may also be safe to apply to conductive surfaces and may eliminate sparks, fires, or other hazards that are created when an electroadhesion device 100 that is generating a high voltage contacts and/or is placed close to a conductive target surface. Similarly, when the sensor 114 detects a different surface with different characteristics, the digital switch 116 controls the voltage converter 108 to generate a different adjustable voltage that is sufficient to attach and secure the electroadhesion device 100 to that different surface. For example, in response to detecting an organic target surface (e.g., wood, drywall, fabric, and the like) by the sensor 114, the digital switch 116 may cause the voltage converter 108 to generate an adjustable voltage that may be sufficient to attach and secure the electroadhesion device to the organic target surface without creating hazards. The adjustable voltage may also minimize the voltage output to avoid hazards that may be created when the electroadhesion device 100 is accidently moved. In response to detecting a smooth target surface (e.g., glass) or an insulating target surface (e.g., plastic, stone, sheetrock, ceramics, and the like) by the sensor 114, the digital switch 116 may cause the voltage converter to generate an adjustable voltage sufficient to attach and secure the electroadhesion device 100 to the smooth and/or insulating target surface without creating hazards. Thus, the electroadhesion device 100 has an adjustable voltage level that is adjusted based on a characteristic of the surface determined by the sensor 114 resulting in an electroadhesion device 100 that can be safely used to attach to various target surfaces without safety hazards.

The strength (i.e. amount of voltage) of the adjustable voltage may vary depending on the material of the target surface. For example, the strength of the adjustable voltage required to attach the electroadhesion device 100 to a conductive target surface (e.g., metal) may be higher than the adjustable voltage required to attach the electroadhesion device 100 to an insulating target surface, a smooth target surface, and/or an organic target surface. The strength of the adjustable voltage required to attach the electroadhesion device 100 to an organic target surface may be greater than the adjustable voltage required to attach the electroadhesion device 100 to a conductive target surface and less than the adjustable voltage require to attach the electroadhesion device 100 to an insulating target surface. The strength of the adjustable voltage required to attach the electroadhesion device 100 to an insulating target surface may be higher than the adjustable voltage required to attach the electroadhesion device 100 to an organic target surface or a conductive target surface. The electroadhesion device 100 may be configured to attach to any type of surface (e.g., metallic, organic, rough, smooth, undulating, insulating, conductive, and like). In some embodiments, it may be preferable to attach the electroadhesion device 100 to a smooth, flat surface.

Attaching the electroadhesion device 100 to some target surfaces requires a very high voltage. For example, a very high voltage output may be required to attach the electroadhesion device 100 to a rough target surface, a very smooth target surface (e.g., glass), and/or an insulating target surface. An electroadhesion device 100 generating a high voltage output may generate sparks, fires, electric shock, and other safety hazards when placed into contract with—and/or in close proximity to—conductive surfaces. To avoid safety hazards, some embodiments of the electroadhesion device 100 may not generate a high voltage and may only generate an output voltage sufficient to attach the electroadhesion device 100 to conductive target surfaces, organic target surfaces, and the like.

When the electroadhesion device 100 is moved to a new target surface, the sensor 114 may automatically detect one or more characteristics of the new target surface and/or the surrounding environment and/or determine the material type for the new target surface. The digital switch 116 (i.e., controller) may then modify and/or maintain the voltage output generated by the voltage converter 108 based on the material type and/or characteristics for the new target surface and/or environment. To determine the adjustable voltage to generate using the voltage converter, the digital switch 116 may include logic for determining the voltage based on sensor data received from the sensor 114. For example, the digital switch 116 may include logic for using a look up table to determine the proper adjustable voltage based on the sensor data. The logic incorporated into the digital switch 116 may also include one or more algorithms for calculating the proper adjustable voltage based on the sensor data. Additionally, if the sensor 114 detects the electroadhesion device 100 is moved away from a target surface, the digital switch 116 may power down the voltage converter 108 and/or otherwise terminate voltage output from the voltage converter 108 until a new target surface is detected by the sensor 114.

To enhance safety, the digital switch 116 may include safety logic that ensures the voltage converter 108 generates a low voltage when the electroadhesion device 100 is turned on and or first contacts a target surface. The safety logic may also cause the digital switch 116 to gradually ramp up the strength of the adjustable voltage from a low voltage to a high voltage when the electroadhesion device 100 contacts a target surface that requires a high voltage or a very high voltage (e.g., a smooth surface such as glass or an insulating surface such as wood). The safety logic may ensure the digital switch 116 causes the voltage converter 108 to increase the adjustable voltage at a predefined rate. The predefined rate of increase for the adjustable voltage may depend on the maximum and or minimum strength of the adjustable voltage generated by the voltage converter 108. For example, the predefined rate of increase may be higher (e.g., 50 volts per second (V/s) for electroadhesion devices 100 having a greater maximum adjustable voltage (e.g., 2,000 V). The predefined rate of increase may be lower (e.g., 20 V/s) for electroadhesion devices 100 having a lower maximum adjustable voltage (e.g., 250 V).

The one or more sensors 114 can include a wide variety of sensors 114 for measuring characteristics of the target surface and or surrounding environment (e.g., surface sensors, heat sensors, humidity sensors, motion sensors, and the like). Each sensor 114 may be operated by a sensor control circuit 118. The sensor control circuit 118 may be included in the sensor 114 or may be a distinct component. The sensor control circuit 118 can be a microcontroller or other integrated circuit having programmable logic for controlling the sensor 114. For example, the sensor control circuit may initiate capture of sensor data, cease capture of sensor data, set the sample rate for the sensor, control transmission of sensor data measured by the sensor 114, and the like. Sensors 114 can include conductivity sensors (e.g., electrode conductivity sensors, induction conductivity sensors, and the like); Hall effect sensors and other magnetic field sensors; porosity sensors (e.g., time domain reflectometry (TDR) porosity sensors); wave form sensors (e.g., ultrasound sensors, radar sensors, infrared sensors, dot field projection depth sensors, time of flight depth sensors); motion sensors; heat sensors, humidity sensors, and the like. Sensor data measured by the one or more sensors 114 may be used to determine one or more characteristics of the target surface. For example, sensor data may be used to determine the target surface's conductivity and other electrical or magnetic characteristics; the material's porosity, permeability, and surface morphology; the materials hardness, smoothness, and other surface characteristics; the distance the target surface is from the sensor; the temperature of the electroadhesion device 100; the humidity, air temperature, or other characteristics of the air or other aspects of the environment surrounding the electroadhesion device 100; and the like. One or more characteristics determined from sensor data may be used to control the digital switch 116 directly. Sensor data may also be sent to a data analysis module 422 shown in FIG. 4. The data analysis module may refine the sensor data and use it to determine a characteristic and/or material type (e.g., metal, wood, plastic, ceramic, concreate, drywall, glass, stone and the like) for the target surface. The digital switch 116 (i.e., controller) may then control the voltage output from the voltage converter 108 based on the characteristic and/or material type for the target surface determined by the data analysis module.

The one or more sensors 114 may include a double backup or other redundant arrangement of multiple instances of the same sensor. For example, the double backup arrangement of sensor may include three sensors of the same type (i.e., a first sensor and two backup sensors). The sensor control circuit 118 may include logic to operate the three sensors included in the double backup arrangement to measure one or more characteristics of the target surface and or surrounding environment at the same time. The double backup arrangement of sensors may improve the safety of the electroadhesion device 100 by detecting sensor faults that may occur when one of the sensors is damaged or malfunctions. To detect sensor faults, the sensor control circuit 118 may verify the accuracy of the measurement taken by the first sensor using the measurements taken by the two backup sensors. If all three measurements agree (i.e., are within a threshold percent difference), the sensor control circuit 118 may transmit the measurements to the digital switch 116 and the digital switch 116 control the voltage converter 108 based on the verified measurements. If one or more of the measurements taken by the backup sensors does not agree with the measurement taken by the first sensor (i.e., the difference between the measurements exceeds the threshold percent difference), the sensor control circuit 118 may not transmit the unverified measurements to the digital switch 116. Optionally, the sensor control circuit 118 may retake the sensor measurements a pre-defined number of times and or until the measurements can be verified. If the sensor measurements cannot be verified, the digital switch 116 may cause the voltage converter 108 to generate a low strength adjustable voltage instead of adjusting the voltage based on one or more characteristics of the target surface detected by the one or more sensors 114.

The digital switch 116 may function as an essential safety feature of the electroadhesion device 100. The digital switch 116 may reduce the risk of sparks, fires, electric shock, and other safety hazards that may result from applying a high voltage to a conductive target surface. By autonomously controlling the voltage generated by the electroadhesion device 100, the digital switch 116 may also minimize human error that may result when a user manually sets the voltage output of the electroadhesion device 100. For example, human errors may include a user forgetting to change the voltage setting, a child playing with the electroadhesion device and not paying attention to the voltage setting, a user mistaking a conductive surface for an insulating surface, and the like. These errors may be eliminated by using digital switch 116 to automatically adjust the voltage generated by the voltage converter 108 based on sensor data received from the one or more sensors 114 and/or material classifications made by the data analysis module.

The safety logic of the digital switch 116 may also keep the adjustable voltage generated by the voltage converter 108 constant for the entire period of time the electroadhesion device 100 is mounted on a particular surface. The safety logic of the digital switch 116 may also prevent the adjustable voltage from increasing when the electroadhesion device 100 is moved to a different position of the same target surface and or moved to a different target surface. When the electroadhesion device 100 is moved to a new position or different target surface, the safety logic may automatically adjust the voltage generated by the voltage converter 108 to a low adjustable voltage. The safety logic of the digital switch 116 may gradually increase the strength of the adjustable voltage based on the characteristics of the target surface received from the one or more sensors 114 until the strength of the adjustable voltage is sufficient to support the weight of the electroadhesion device 100 and a smartphone, tablet, or other electronic device connected to the electroadhesion device 100. By automatically reducing the strength of the adjustable voltage when the electroadhesion device 100 is moved and gradually ramping up the voltage, the safety logic of the digital switch 116 may prevent a high adjustable voltage from contacting a conductive surface (e.g., metal) when the electroadhesion device 100 is moved.

To promote safely and improve user experience, the electroadhesion device 100 and/or a device 200 integrated with the electroadhesion device 100 may include a sensor actuation mechanism (e.g., button, mechanical switch, UI element, and the like) for actuating the one or more sensors 114 and/or digital switch 116. The sensor(s) 114 and digital switch 116 may also be automatically turned on when the electroadhesion device 100 and/or device 200 is powered on. The electroadhesion device 100 and/or device 200 may also include a signaling mechanism (e.g., status light, UI element, mechanical switch, push notification, automated message, and the like) for communicating the status of the sensor(s) 114 and/or digital switch 116 to a user of the electroadhesion device 100. The signaling mechanism may be used to communicate that the proper adjustable voltage for a particular target surface has been determined.

In various embodiments, the signaling mechanism may be a status light that is red when the sensor(s) 114 (i.e., the surface sensor) and/or digital switch 116 is powered on and sensing the target surface material but has not determined the proper adjustable voltage for the target surface. The status light may turn green when the digital switch 116 has received the surface sensor data, determined the appropriate voltage for the particular target surface, and generated the proper adjustable voltage output and the electroadhesion device 100 is ready to attach to the target surface. The status light may also turn blinking red and/or yellow if there is some problem with determining the voltage for the particular target surface and/or generating the adjustable voltage output for the particular target surface. For example, the status light may blink red and/or turn yellow when the sensor 114 (i.e., surface sensor) is unable to collect surface sensor data, the data analysis module 422 is unable to determine a material type for the target surface material, the digital switch 116 is unable to operate the voltage converter 108, the voltage converter 108 is unable to generate the correct voltage, and the like.

The signaling mechanism may also communicate information about the connection between the electroadhesion device 100 and the device 200. For example, the status light may turn red when the electroadhesion device 100 is not able to connect (e.g., establish a wireless connection to transmit communications) with the device 200. The speaker of the device 200 may also emit a beep, chime, ring, or other audio signal when the device 200 is not able to connect to the electroadhesion device 100. Conversely, the status light may turn green when the electroadhesion device 100 establishes a connection with device 200. The speaker of the device 200 may also emit an audio signal when the device connects to the electroadhesion device 100. The status light may also turn red and or blink when the electroadhesion device 100 is too far away from the device 200 to connect to the device 200 and or the device 200 determines the user has walked away from the electroadhesion device 100. For example, when the device 200 determines the user is not within a filed of view of a camera included in the device 200 for a pre-determined period of time when the device 200 is connected to the electroadhesion device 100. The speaker of the device 200 may also emit an audio signal when the device 200 determines the user has left the electroadhesion device 100.

The signaling mechanism may also communicate information about the battery status of the electroadhesion device 100. For example, the status light may turn red and or the speaker of the device 200 may emit an audio signal when the battery of the electroadhesion device 100 falls below a pre-determined extremely low battery level threshold (e.g., 5% or less of the total battery life remaining). The status light may turn yellow and or the speaker of the device 200 may emit an audio signal when the battery of the electroadhesion device 100 falls below a pre-determined low battery level threshold (e.g., 20% or less of the total battery life remaining). The status light may turn green and or the speaker of the device 200 may emit an audio signal when the battery of the electroadhesion device 100 raises above a pre-determined full battery level threshold (e.g., 80% or more of the total battery life remaining).

The particular signaling mechanism used to signal each of the statuses and or events described above may be customized. For example, a user may select status lights, audio signals, and or another signaling mechanism for each status or event. The particular audio signals selected for each status and or event may also be selected by the user. A settings user interface built into the device 200 operating system may be used to select and or change the signaling mechanisms for each status. An application for controlling the electroadhesion device 100 that may be installed on the device 200 may also be used to select and or modify the signaling mechanism for each event and or status. The type of signaling mechanism and or the statuses and events to use each signaling mechanism may also be automatically controlled based on the location of the device 200, time of day, or other conditions. For example, the signaling mechanism for alerting the user when the user walks away from the electroadhesion device 100 may be disabled when the user is at the user's home, office, or other private location where other people will not have free access to the electroadhesion device 100 and or the device 200. The signaling mechanisms may also be manually disabled and or enabled.

As described herein, voltage generated by the voltage converter 108 is defined as a range of DC voltage of any one or more of the following from 250 V to 10,000 V; from 500 V to 10,000 V; from 1,000 V to 10,000 V; from 1,500 V to 10,000 V; from 2,000 V to 10,000 V; from 3,000 V to 10,000 V; from 4,000 V to 10,000 V; from 5,000 V to 10,000 V; from 6,000 V to 10,000 V; from 7,000 V to 10,000 V; from 250 V to 1,000 V; from 250 V to 2,000 V; from 250 V to 4,000 V; from 500 V to 1,000 V; from 500 V to 2,000 V; from 500 V to 4,000 V; from 1,000 V to 2,000 V; from 1,000 V to 4,000 V; from 1,000 V to 6,000 V; from 2,000 V to 4,000 V; from 2,000 V to 6,000 V; from 4,000 V to 6,000 V; from 4,000 V to 10,000 V; from 6,000 V to 8,000 V; and from 8,000 V to 10,000 V.

As described herein, voltage generated by the voltage converter 108 is defined as a range of AC voltage of any one or more of the following from 250 $V_{rms}$ to 10,000 $V_{rms}$; from 500 $V_{rms}$ to 10,000 $V_{rms}$; from 1,000 $V_{rms}$ to 10,000 $V_{rms}$; from 1,500 $V_{rms}$ to 10,000 $V_{rms}$; from 2,000 $V_{rms}$ to 10,000 $V_{rms}$; from 3,000 $V_{rms}$ to 10,000 $V_{rms}$; from 4,000 $V_{rms}$ to 10,000 $V_{rms}$; from 5,000 $V_{rms}$ to 10,000 $V_{rms}$; from 6,000 $V_{rms}$ to 8,000 $V_{rms}$; from 7,000 $V_{rms}$ to 8,000 $V_{rms}$; from 8,000 $V_{rms}$ to 10,000 $V_{rms}$; from 9,000 $V_{rms}$ to 10,000 $V_{rms}$; from 250 $V_{rms}$ to 1,000 $V_{rms}$; from 250 $V_{rms}$ to 2,000 $V_{rms}$; from 250 $V_m$ to 4,000 $V_{rms}$; from 500 $V_{rms}$ to 1,000 $V_{rms}$; from 500 $V_{rms}$ to 2,000 $V_{rms}$; from 500 $V_{rms}$ to 4,000 $V_{rms}$; from 1,000 V to 2,000 $V_{rms}$; from 1,000 $V_{rms}$ to 4,000 $V_{rms}$; from 1,000 V to 6,000 $V_{rms}$; from 2,000 $V_{rms}$ to 4,000 $V_{rms}$; from 2,000 $V_{rms}$ to 6,000 $V_{rms}$; from 4,000 $V_{rms}$ to 6,000 $V_{rms}$; from 4,000 $V_{rms}$ to 8,000 $V_{rms}$; and from 6,000 $V_{rms}$ to 8,000 $V_{rms}$.

As described herein, voltage generated by the voltage converter 108 is defined as a range of DC voltage of any one or more of the following from about 250 V to about 10,000 V; from about 500 V to about 10,000 V; from about 1,000 V to about 10,000 V; from about 1,500 V to about 10,000 V; from about 2,000 V to about 10,000 V; from about 3,000 V to about 10,000 V; from about 4,000 V to about 10,000 V; from about 5,000 V to about 10,000 V; from about 6,000 V to about 8,000 V; from about 7,000 V to about 8,000 V; from about 250 V to about 1,000 V; from about 250 V to about 2,000 V; from about 250 V to about 4,000 V; from about 500 V to about 1,000 V; from about 500 V to about 2,000 V; from about 500 V to about 4,000 V; from about 1,000 V to about 2,000 V; from about 1,000 V to about 4,000 V; from about 1,000 V to about 6,000 V; from about 2,000 V to about 4,000 V; from about 2,000 V to about 6,000 V; from about 4,000 V to about 6,000 V; from about 4,000 V to about 8,000 V; from about 6,000 V to about 8,000 V; from about 8,000 V to about 10,000 V; and from about 9,000 V to about 10,000 V.

As described herein, voltage generated by the voltage converter 108 is defined as a range of AC voltage of any one or more of the following from about 250 $V_{rms}$ to about 10,000 $V_{rms}$; from about 500 $V_{rms}$ to about 10,000 $V_{rms}$; from about 1,000 $V_{rms}$ to about 10,000 $V_{rms}$; from about 1,500 $V_{rms}$ to about 10,000 $V_{rms}$; from about 2,000 $V_{rms}$ to about 10,000 $V_{rms}$; from about 3,000 $V_{rms}$ to about 10,000 $V_{rms}$; from about 4,000 $V_{rms}$ to about 10,000 $V_{rms}$; from about 5,000 $V_{rms}$ to about 10,000 $V_{rms}$; from about 6,000 $V_{rms}$ to about 8,000 $V_{rms}$; from about 7,000 $V_{rms}$ to about 8,000 $V_{rms}$; from about 250 $V_{rms}$ to about 1,000 $V_{rms}$; from about 250 $V_{rms}$ to about 2,000 $V_{rms}$; from about 250 $V_{rms}$ to about 4,000 $V_{rms}$; from about 500 $V_{rms}$ to about 1,000 $V_{rms}$; from about 500 $V_{rms}$ to about 2,000 $V_{rms}$; from about 500 $V_{rms}$ to about 4,000 $V_{rms}$; from about 1,000 $V_{rms}$ to about 2,000 $V_{rms}$; from about 1,000 $V_{rms}$ to about 4,000 $V_{rms}$; from about 1,000 $V_{rms}$ to about 6,000 $V_{rms}$; from about 2,000 $V_{rms}$ to about 4,000 $V_{rms}$; from about 2,000 $V_{rms}$ to about 6,000 $V_{rms}$; from about 4,000 $V_{rms}$ to about 6,000 $V_{rms}$; from about 4,000 $V_{rms}$ to about 8,000 $V_{rms}$; from about 6,000 $V_{rms}$ to about 8,000 $V_{rms}$; from about 8,000 $V_{rms}$ to about 10,000 $V_{rms}$; and from about 9,000 $V_{rms}$ to about 10,000 $V_{rms}$.

As described herein, voltage output from the power supply 112 is defined as a range of DC voltage of any one or more of the following from 2.0 V to 249.99 V; from 2.0 V to 150.0 V; from 2.0 V to 100.0 V; from 2.0 V to 50.0 V; from 5.0 V to 249.99 V; from 5.0 V to 150.0 V; from 5.0 V to 100.0 V; from 5.0 V to 50.0 V; from 50.0 V to 150.0 V; from 100.0 V to 249.99 V; from 100.0 V to 130.0 V; and from 10.0 V and 30.0 V.

As described herein, voltage output from the power supply 112 is defined as a range of AC voltage of any one or more of the following from 2.0 $V_{rms}$ to 249.99 $V_{rms}$; from 2.0 $V_{rms}$ to 150.0 $V_{rms}$; from 2.0 $V_{rms}$ to 100.0 $V_{rms}$; from 2.0 $V_{rms}$ to 50.0 $V_{rms}$; from 5.0 $V_{rms}$ to 249.99 $V_{rms}$; from 5.0 $V_{rms}$ to 150.0 $V_{rms}$; from 5.0 $V_{rms}$ to 100.0 $V_{rms}$; from 5.0 $V_{rms\ to}$ 50.0 $V_{rms}$; from 50.0 $V_{rms}$ to 150.0 $V_{rms}$; from 100.0 $V_{rms}$ to 249.99 $V_{rms}$; from 100.0 $V_{rms}$ to 130.0 $V_{rms}$; and from 10.0 $V_{rms}$ and 30.0 $V_{rms}$.

As described herein, voltage output from the power supply 112 is defined as a range of DC voltage of any one or more of the following from about 2.0 V to about 249.99 V; from about 2.0 V to about 150.0 V; from about 2.0 V to about 100.0 V; from about 2.0 V to about 50.0 V; from about 5.0 V to about 249.99 V; from about 5.0 V to about 150.0 V; from about 5.0 V to about 100.0 V; from about 5.0 V to about 50.0 V; from about 50.0 V to about 150.0 V; from about 100.0 V to about 249.99 V; from about 100.0 V to about 130.0 V; and from about 10.0 V and 30.0 V.

As described herein, voltage output from the power supply 112 is defined as a range of AC voltage of any one or more of the following from about 2.0 $V_{rms}$ to about 249.99 $V_{rms}$; from about 2.0 $V_{rms}$ to about 150.0 $V_{rms}$; from about 2.0 $V_{rms}$ to about 100.0 $V_{rms}$; from about 2.0 V to about 50.0 $V_{rms}$; from about 5.0 $V_{rms}$ to about 249.99 $V_{rms}$; from about 5.0 $V_{rms}$ to about 150.0 $V_{rms}$; from about 5.0 $V_{rms}$ to about 100.0 $V_{rms}$; from about 5.0 $V_{rms}$ to about 50.0 $V_{rms}$; from about 50.0 $V_{rms}$ to about 150.0 $V_{rms}$; from about 100.0 $V_{rms}$ to about 249.99 $V_{rms}$; from about 100.0 $V_{rms}$ to about 130.0 $V_{rms}$; and from about 10.0 $V_{rms}$ and 30.0 $V_{rms}$.

Figure 2A:
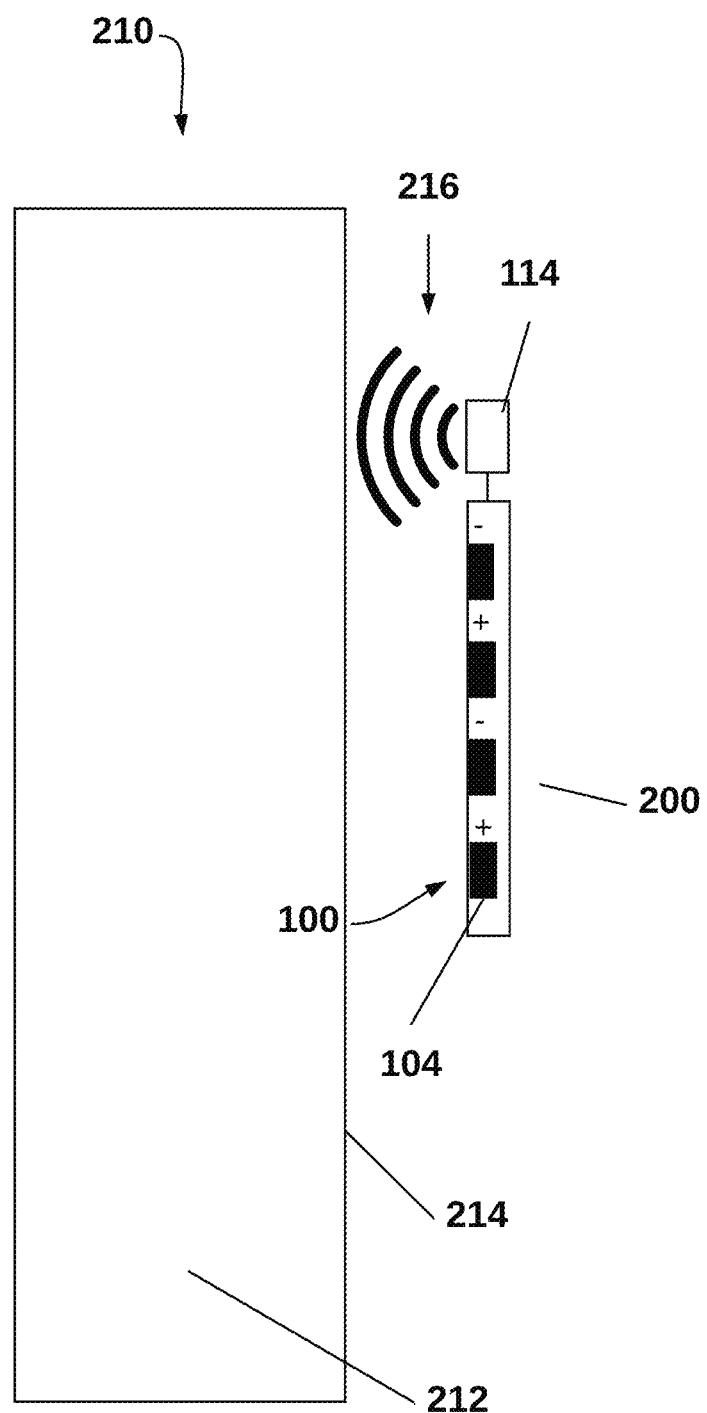
FIG. 2A illustrates the exemplary electroadhesion device on a consumer product with a sensor scanning a target surface before an electroadhesion device is attached to the target surface.
Figure 2B:
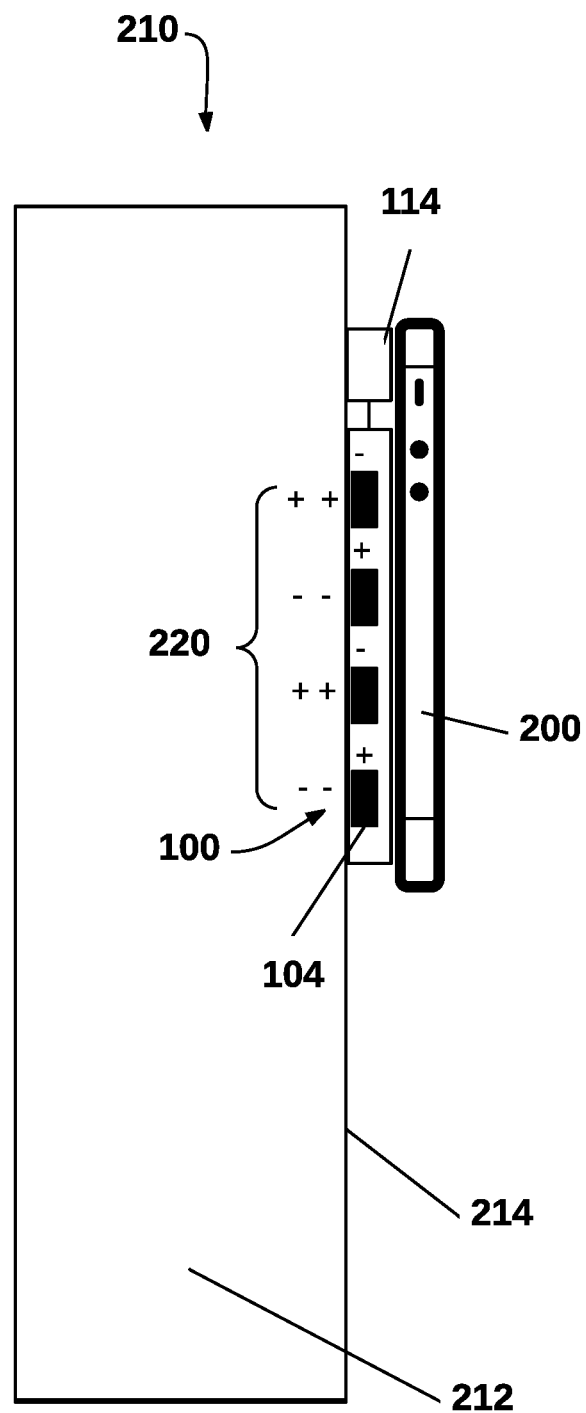
FIG. 2B illustrates the consumer device mounted to a target surface using the exemplary electroadhesion device shown in FIGS. 1 and 2A.

FIGS. 2A-B illustrate a device 200 integrated with an electroadhesion device 100. The electroadhesion device 100 may be integrated into any portion of the device 200. For example, the electroadhesion device 100 may be placed directly underneath the display screen of the device 200. Placing the electroadhesion device 100 underneath the display screen allows both the front and back sides of the device 200 be attached to the target surface 210 using the electroadhesion device 100. Positioning the electroadhesion device 100 underneath the display screen also enables the side of the electroadhesion device 100 opposite the target surface 210 to repel electrons and other charged particles. The repelled particles may push the device 200 into the target surface to strengthen the electrostatic attraction between the electroadhesion device 100 and the target surface 210. In the embodiment in which the electroadhesion device 100 is underneath the display screen, the display screen may be a touch screen display and the touch screen display may be a thinner layer than a normal touch screen layer or coating in order to provide maximum electrostatic forces when the electroadhesion device 100 is activated.

In addition, the touch screen layer may also be controllable to create friction known as electrovibration that helps to adhere the device to a surface. Specifically, the electrovibration can be used to adhere the device 200 to the surface using the front of the device 200 so that a user can have an option for using the cameras on the back of the device 200 (i.e., on the back of a smartphone or tablet) since they are better quality.

In various embodiments, the electroadhesion device 100 may be used to mount the device 200 to a target surface 210 including walls, mirrors, trees, furniture, and the like. FIGS. 2A-B show a side view of a device 200 integrated with an electroadhesion device 100. The electroadhesion device 100 may include one or more sensors 114 for measuring one or more characteristics of the target surface 210.

In various embodiments, the electroadhesion device 100 may be used to mount the device 200 to a target surface 210 including walls, mirrors, trees, furniture, and the like. FIGS. 2A-B show a side view of a device 200 integrated with an electroadhesion device 100. The electroadhesion device 100 may include one or more sensors 114 for measuring one or more characteristics of the target surface 210.

As shown in FIG. 2A, to measure one or more characteristics of the target surface 210, the one or more sensors 114 may receive data about a characteristic. In various embodiments, the sensor 114 may emit a signal, pulse, or other waveform transmission 216 towards the target surface. The one or more sensors 114 may then detect a signal reflected back off of the target surface as sensor data. Sensor data is then used to determine one or more characteristics and/or material types for a target surface. Based on the characteristics and/or material types identified using sensor data, the voltage generated and applied to each of the electrodes 104 is adjustably controlled using the digital switch 116. Adjusting the voltage output to the electrodes 104 according to the target material, eliminates sparks, fires, electric shock, and other safety hazards that may result when too much voltage is applied to conductive target surfaces. The sensors 114 may also be used to detect an authorized user of the electroadhesion device 100 to minimize human error, accidental voltage generation, and unintended operation of the electroadhesion device 100.

As shown in FIG. 2B, to attach the device 200 to the target surface 210, an electrostatic adhesion voltage is generated by the one or more electrodes 104 in response to the adjustable voltage. The electrostatic adhesion voltage uses alternating positive and negative charges on adjacent electrodes 104. The voltage difference between the electrodes 104 induces a local electric field 220 in the target surface 210 around the one or more electrodes 104. The electric field 220 locally polarizes the target surface 210 and causes an electrostatic adhesion between the electrodes 104 of the electroadhesion device 100 and the induced charges on the target surface 210.

Figure 3:
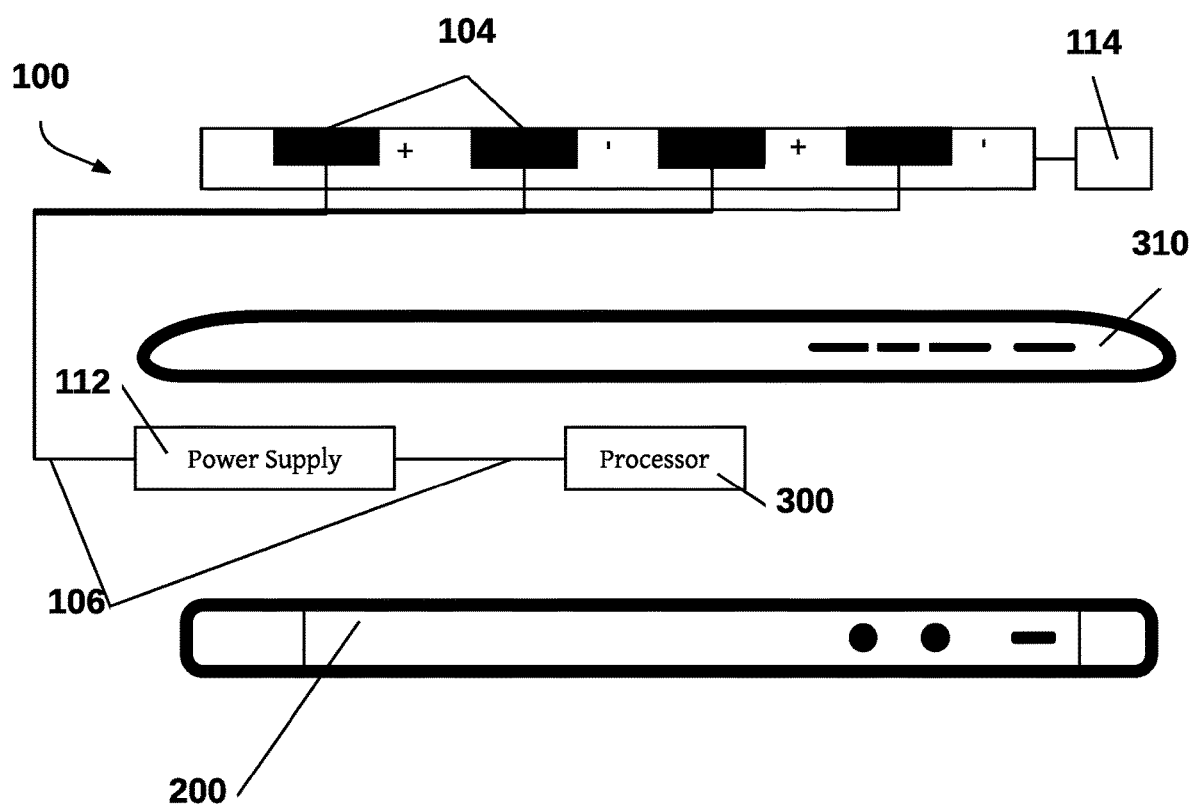
FIG. 3 illustrates an exploded view of an electroadhesion device integrated into a case of a consumer device.

FIG. 3 illustrates an exemplary electroadhesion device 100 integrated into a case 310. The electroadhesion device 100 may be integrated into any aspect of the case 310. For example, the electroadhesion device 100 may be fixed to the back surface and or inside surface of the case 310. The electroadhesion device 100 may also be integrated into the edges of the case 310 so that an edge of the device 200 may be mounted and or attached to a table or other flat horizontal surface. Attaching the device 200 to a flat horizontal surface using a electroadhesion device 100 integrated into the edges of the device 200 allows a user to stand the device 200 up on an edge of the device so that the screen of the device 200 is visible when the device 200 is on a table or other flat horizontal surface without having to lean the device against a stand or other object. The case 310 may be a protective case that functions to protect the device 200 from damage as a result of use, human error, weather, and the like. The case 310 may have a rubberized exterior that is completely waterproof. When fixed to a device 200, the case 310 functions as a device holder that may secure the device 200 to a target surface using the electrostatic device 100. The device 200 may removably attach to the case 310 in an arrangement that prevents the device 200 from sliding vertically in and or out of the case 310 so that the device 200 will not slide out of the case 310 when the case 310 is vertically mounted to a flat surface.

To activate and de-activate the electrostatic device 100, one or more electrical connections 106 may transfer electrical signals from the processor 300 to the power supply 112. The electrical signals may indicate how much power to provide to the one or more electrodes 104. The processor 300 may also execute one or more functions of the digital switch to operate the voltage converter. The voltage converter may convert a voltage supplied by the power supply into a high voltage output generated by the one or more electrodes to create a electroadhesive force. The case 310 may be any known device case including a smartphone protective case, tablet protective case, camera protective case, and the like. The case 310 may attach to a device by any known method including, for example, stretching over the edges of the device 200 and retracting to securely cover the device 200. The case 310 may also be the housing of a consumer device 200 in which the electroadhesion device 100 is attached to the outside of the case 310 as shown in FIG. 3 or integrated into the case 310.

Figure 4:
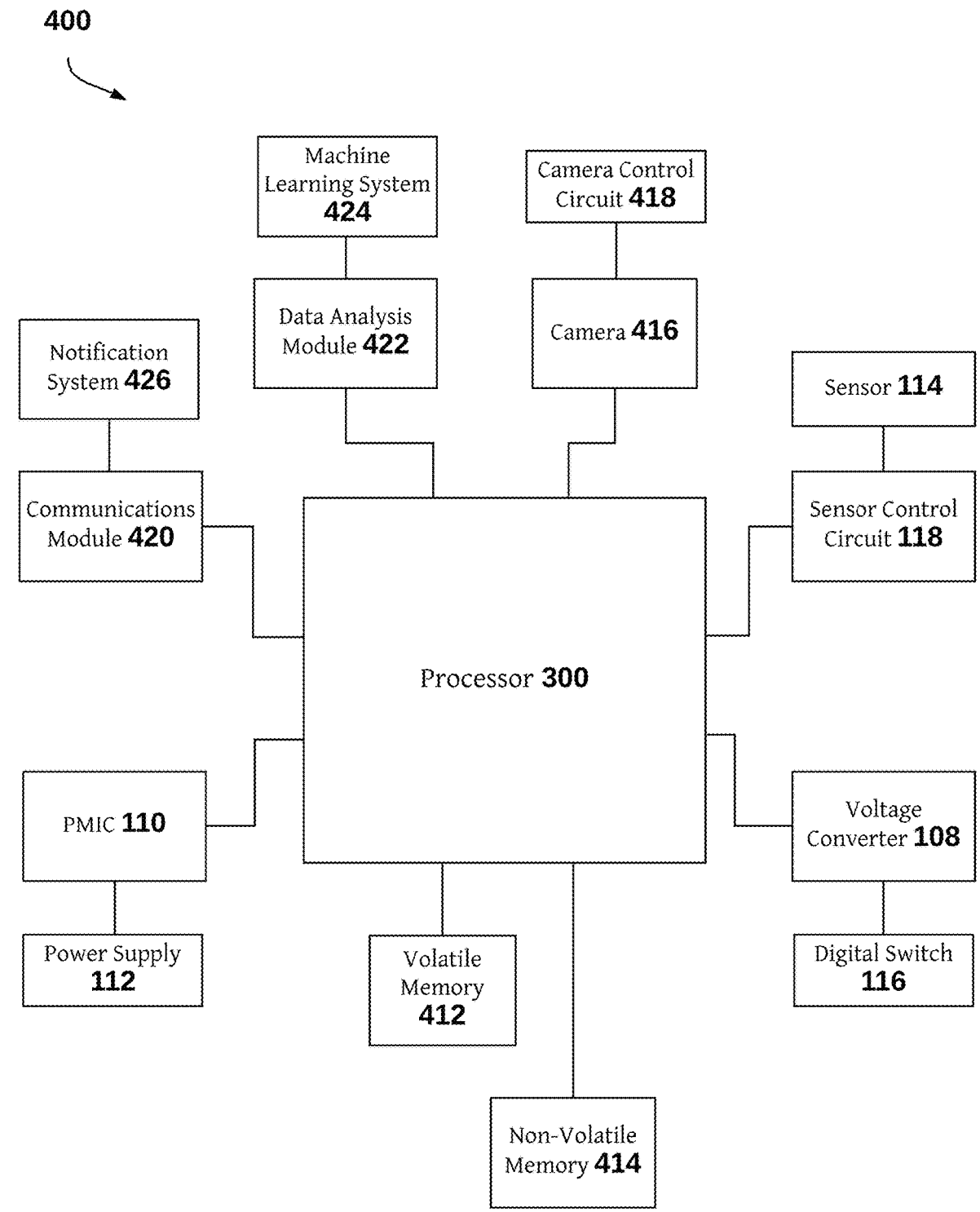
FIG. 4 illustrates exemplary circuitry included in the electroadhesion device.

FIG. 4 illustrates an exemplary board 400 for mounting one or more components of the electroadhesion device 100. The board 400 may be any known board containing one or more electric circuits, for example, a circuit board, printed circuit board, and the like. The board 400 may include a processor 300 for executing commands and instructions of one or more of the components. Suitable processors 300 for the execution of a program of instructions may include, by way of example, both general and special purpose microcontrollers or microprocessors, and the sole processor or one of multiple processors or cores, of any kind of computer. Generally, a processor 300 may receive instructions and data from a volatile memory 412 or a non-volatile memory 414 or both. Suitable volatile memory 412 may include RAM, high speed memory, double data rate memory, 4R memory, and the like. Suitable non-volatile memory 414 may include embedded MMC or eMMC, solid-state drive or SSD, and the like.

To convert voltage from the power supply 112 current to an output voltage for electroadhesion, the processor 300 may execute instructions on a voltage converter 108. Operation of the voltage converter 108 may be controlled by a digital switch 116. By dictating the strength of the voltage output by the voltage converter 108, the digital switch 116 may be used to control the voltage output of the electroadhesion device 100. In various embodiments, the digital switch 116 may be used to adjust the strength of the voltage output generated by the voltage converter 108 based on the type of material interfacing with the electroadhesion device 100.

A combination of one or more sensors 114 may be used to determine the type of material interfacing with the electroadhesion device 100. The sensor 114 may be a conductivity sensor that measures the conductivity of a material interfacing with the electroadhesion device 110. The conductivity sensor may include one or more electrodes for measuring conductivity. To measure conductivity using the one or more electrodes, the electrodes are placed in contact with a target surface. A voltage is then applied at one of the electrodes to generate a current. A second electrode is then used to measure the current flowing through the target surface material. The greater the current measured at the second electrode, the greater the conductivity of the target surface material. The conductivity sensor may also include a contactless sensor (i.e., an induction conductivity sensor) that measures conductivity using two or more toroidal coils. To measure conductivity, one coil emits an electric field in the direction of the target surface. A second coil measures the magnitude of a small electric current induced by the electric field emitted by the first coil. The strength of the induced electric current is proportional to the number of ions present in the target surface material.

Other sensors 114 may include Hall effect sensors or other magnetic field sensors that can determine the electric characteristics of the target surface material based on the material's magnetic characteristics. Porosity sensors may also be used to determine surface characteristics of the target surface material. Porosity sensors may apply time domain reflectometry (TDR) to measure moisture transport in unsaturated porous materials. TDR based porosity sensors may emit a wave pulse or other signal into a target surface material. The TDR porosity sensor then detects the reflected signal that bounces back from the target surface material and determines porosity and moisture content based on an analysis of the reflected waveform. Sensors 114 may also include ultrasound sensors, radar sensors, infrared sensors, dot field projection depth sensors, time of flight depth sensors, and other wave form based sensors for detecting characteristics of the target surface material.

A sensor control circuit 118 may be used to control one or more aspects of the one or more sensors 114. For example, the sensor control circuit 118 may control the sample rate of the sensor 114, the amount of voltage applied to the electrodes or coils of a conductivity sensor, the strength of the signal emitted by TDR porosity sensor, and the like. The sensor control circuit 118 may include logic for ensuring a high sampling rate for sensor data measurements. For example, sampling rates of 0.1-5 seconds may be used to obtain sufficient data to accurately determine characteristics of the target surface in the time it takes the user to move the electroadhesion device 100 into contact with a wall, door, mirror, or other target surface. The processor 300 may facilitate communications between one or more sensors 114 to compensate the measurements made by one sensor based on the sensor data collected by a second sensor. For example, the conductivity of a material may depend on the temperature of the material. Therefore, temperature data collected by a temperature sensor may be used to adjust the conductivity measurements obtained by a conductivity sensor. To improve the accuracy and reliability of sensor data, the sensor control circuit 118 may also include logic that controls transmission of sensor data to the communications module 420 and/or data analysis module 422. For example, the sensor control circuit 118 may ensure sensor data does not contain errors and is collected by a properly functioning sensor before the data is provided to the data analysis module 422 or used to control operation of the digital switch 116.

Measurements and other sensor data captured by the one or more sensors 114 may be transmitted to the data analysis module 422. The data analysis module 422 may perform one or more operations to refine sensor data. For example, the data analysis module 422 may organize and improve the quality of sensor data by time stamping sensor data points, averaging a series of sensor measurements, converting the sensor data to another form or unit, and/or performing other statistical operations to remove outliners, reduce variation, minimize error, and the like. The data analysis module 422 may also analyze sensor data using any known technique, for example, statistical, algorithmic and/or heuristic analysis, to determine the type of target surface material.

Once the type of surface material is determined, the digital switch 116 may operate the voltage converter 108 to generate a voltage that is sufficient the attach the electrostatic device 100 to the target surface. The digital switch 116 may dynamically adjust the voltage output by the voltage converter 108 based on the target surface material to ensure safe operation of the electrostatic device. The voltage required to attach the electroadhesion device 100 to a target surface depends on the characteristics of the target surface material, for example, the material's conductivity and other electrical or magnetic characteristics, the material's porosity, surface morphology, and other surface characteristics, and the like.

In various embodiments, outputs from one or more sensors 114 may be combined with image data captured by one or more cameras 416. The combination of sensor data and image data may be used to determine the material type of a target surface material and/or validate a user of the electroadhesion device 100. The camera 416 may be included in the electroadhesion device 100 or a device 200 integrated with the electroadhesion device 100. A camera control circuit 418 may operate the camera 416 to capture image data including images of the target surface material and a user of the electroadhesion device 100. The camera control circuit 418 may be included in the camera 416 or may be a separate component of the electroadhesion device 100.

To determine the material type of the target surface material, sensor data from the one or more sensors 114 and image data from the camera 416 may be transmitted to the data analysis module 422. The data analysis module 422 may include a machine learning system 424 that performs one or more image classification tasks. For example, the machine learning system 424 may generate a material prediction that predicts the type of material for a target surface. The machine learning system 424 may also generate a user prediction that predicts whether the user of the electroadhesion system is an authorized user. The machine learning system 424 may include a data processing pipeline and a classification engine. The data processing pipeline may prepare training data including image data and sensor data for training one or more machine learning models. The classification engine may generate one or more machine learning models by processing training data using one or more machine learning algorithms and/or a neural network or other deep learning system.

To generate a material classification model that predicts the material type for a target surface, the machine learning system 424 may process training data including a plurality of images of different materials using a convolutional neutral network (CNN). The CNN may train a material classification model by extracting features from images included in the training data using one or more convolutional layers. Outputs from the convolutional layers may then be fed into one or more classification layers, for example, a feed forward layer, de-convolution layer, and the like, to generate a material prediction based on the features extracted by the convolutional layers.

During training, the convolutional layers may extract features from all images in the training data. The trainable parameters of the classification layers may be initialized and updated to maximize model performance. Model performance may be approximated as the error for an objective function of a training task. Training tasks may include image classification tasks for example, classifying images with wood materials, classifying images with conductive materials, and the like. To improve model performance and minimize error for one or more training tasks, one or more training cycles may be repeated using updated features and/or model parameters. Post training, the extracted feature sets and trained parameters included in the highest performing material classification model are saved in a model file that may be inferenced by the data analysis module 422 to generate a material type prediction.

To improve the accuracy of material type predictions, the machine learning system may incorporate data from one or more sensors 114. The data processing pipeline may incorporate sensor data into training datasets used by the classification engine to generate predictions. For example, sensor data including depth measurements, conductivity values, wave intensities, and the like collected by sensors including an infrared sensor, time of flight depth sensor, conductivity sensor, and the like may be processed by the classification engine. One or more machine learning algorithms and/or neural network layers may extract features from the sensor data. The sensor data features may then be added to the material classification model and used to make more accurate predictions. Additionally, the classification engine may generate a separate material classification model using sensor data. The classification engine may then ensemble the sensor data material classification model with the image data material classification model to generate a material type prediction.

The machine learning system 424 may also generate a user validation model that predicts whether the user of the electroadhesion device 100 is an authorized user. To generate the user validation model, the machine learning system 424 may process training data including a plurality of images of people, animals, and objects using a convolutional neutral network (CNN). The CNN may train a user validation model by extracting features from images included in the training data using one or more convolutional layers. Outputs from the convolutional layers may then be fed into one or more classification layers, for example, a feed forward layer, de-convolution layer, and the like, to generate a user prediction based on the features extracted by the convolutional layers.

The user validation model may be an additional safety feature of the electroadhesion device 100. For example, the user validation model may be trained to recognize one or more images of authorized users of the electroadhesion device 100 that are included in training data. When the electroadhesion device 100 is turned on or actuated, a camera 416 may automatically capture an image of the user. The image may then be classified using the user validation model to generate a user prediction. The electroadhesion device may also validate users using a face scan app (e.g., IOS Face Scan) or other facial scanning technology built-in to a smart phone or other consumer device integrated with the electroadhesion device. If a non-authorized user, for example, a small child, attempts to use the electroadhesion device 100, the user validation model may generate a user prediction that classifies the child as a non-authorized user. In response, to receiving the non-authorized user prediction, the data analysis module 422 may cause the digital switch 116 to power down the voltage converter 108. Powering down the voltage converter 108 prevents the electroadhesion device 100 from generating voltage and ensures an unsupervised child or others will not be harmed by a voltage generated by the electroadhesion device.

The user validation model may also prevent accidental use of the electroadhesion device 100. If the electroadhesion device is actuated by accident, the picture taken by the camera 416 will not be of the user's face. Instead, the picture may capture the user's arm, the inside of a bag or pocket, the user's pet, and like. The picture is then sent to the user validation model to generate a user prediction. Since the user's face is not shown in the picture, the user validation model will generate a user prediction that classifies the picture as a non-authorized user. In response, the data analysis module 422 may cause the digital switch 116 to power down the voltage converter 108 and thereby prevent the electroadhesion device 100 from generating voltage. By automatically powering down the voltage converter 108 in response to detecting an unauthorized user, the user validation model avoids hazards and dangerous situations that can arise from accidental or unintentional generation of voltage. The user validation model may also function as security feature that allows only authorized users to use the electroadhesion device 100.

The processor 300 may be coupled to a communications module 420 to facilitate communicating with external devices. The communication module 420 can include a wireless communications module for transmitting data and/or messages to an external device (e.g., a laptop, smartwatch, an external hard drive, a tablet, a smartphone, and the like). For example, the communications module 420 may connect to a device 200 through a wired and/or wireless connection path to enable control of the electroadhesion device 100 using the device 200. The wireless communications module may include a Wi-Fi chip, an embedded Bluetooth module, and the like. The communications module 420 may transmit data using any known wired or wireless communications protocol, for example, Bluetooth, Wi-Fi, and the like. To facilitate faster communications, the communications module 420 may have multiple pins for connecting multiple parts of the sensor control circuit 118, digital switch 116, camera control circuit 418, and/or data analysis module 422.

The communications module 420 may include a notification system 426. The notification system 426 may connect to a device 200 attached to the electroadhesion device 100 and/or a remote device (e.g. a smartwatch, smartphone, computer, or other consumer device not attached to the electroadhesion device 100) via the communications module 420. The notification system 426 may alert the user to prevent the user from forgetting the electroadhesion device 100 and/or a consumer device 200 secured to a target surface using the electroadhesion device 100. The notification system 426 may include programmable logic that may integrate with a device 200 and/or a remote device to send a notification (e.g., email message, push notification, and the like) to the device 200 and/or remote device after electroadhesion device 100 has been turned on for a set amount of time. For example, the notification system 426 may send a notification if the electroadhesion device 100 has been turned on for 3 minutes, 5 minutes, 10 minutes or any other time period set by the user. The notification system 426 may integrate with a GPS module, mapping application, or other location system of the device 200 and/or electroadhesion device 100 to include to location information (e.g., current geolocation) for the electroadhesion device 100 in the notification.

The notification system 426 may also send a notification to a device 200 and/or remote device if the electroadhesion device 100 is no longer able to establish a connection with the device 200. For example, the device 200 may be connected to an electroadhesion device 100 via a Bluetooth and/or Wifi connection. If the device 200 is no longer able to connect with the electroadhesion device 100 and/or the device 200 is moved to the outer limit of the connection range, the notification system 426 may send a notification to a device 200 and/or remote device. The notification may indicate the connection between the electroadhesion device 100 and the device 200 is lost and/or weak and provide the geolocation of the electroadhesion device 100 and/or device 200. The notification system 426 may also provide one or more electronic and/or mechanical notifications. For example, the notification system 426 may be programmed to make a beeping sound or other audio notification and/or generate a flashing light or other visible notification if the electroadhesion device 100 has been left on for a set amount of time and/or is no longer able to establish a connection with the device 200.

The notification system 426 may also send notifications to the device 200 and/or a remote device that describe functions of the electroadhesion device 100. For example, the notification system 426 may send a notification to the device 200 that indicates when the sensor control circuit 118 takes measurements of the target surface using the one or more sensors and or the sensor control circuit 118 determines one or more characteristics of the target surface based on the sensor measurements. The notification system 426 may also send notifications to the device 200 that indicate when the digital switch 116 determines the adjustable voltage required to mount the electroadhesion device 100 and the device 200 to the target surface and or the voltage converter 108 generates the required adjustable voltage to mount the electroadhesion device 100 and the device 200 to the target surface.

To control charging and withdrawing power from the power supply 112, the processor 300 may execute instructions on a power management integrated circuit (PIMC) 110. The board 400 may include built-in LiPoly charger that interfaces with a USB controller to charge the power supply 112 by plugging a wall charger into a USB port coupled to the processor 300. The power supply 112 supplies electrical energy for running the electrical components of the electroadhesion device 100. To prolong the amount of time the electroadhesion device 100 may be used without recharging the power supply 112, the PMIC 110 may regulate power to one or more components. For example, the PMIC 110 may only power the processor 300 and volatile memory 412 when the electroadhesion device 100 is not in use. The PMIC 110 may also power down one or more components of the electroadhesion device 100 when they are not in use. For example, the PMIC 110 may power down the camera 416 and the camera control circuit 418 after the user of the electroadhesion device 100 is validated, the sensor 114 and the sensor control circuit 118 when the electroadhesion device 100 is securely attached to a target surface, and the like.

Figure 5:
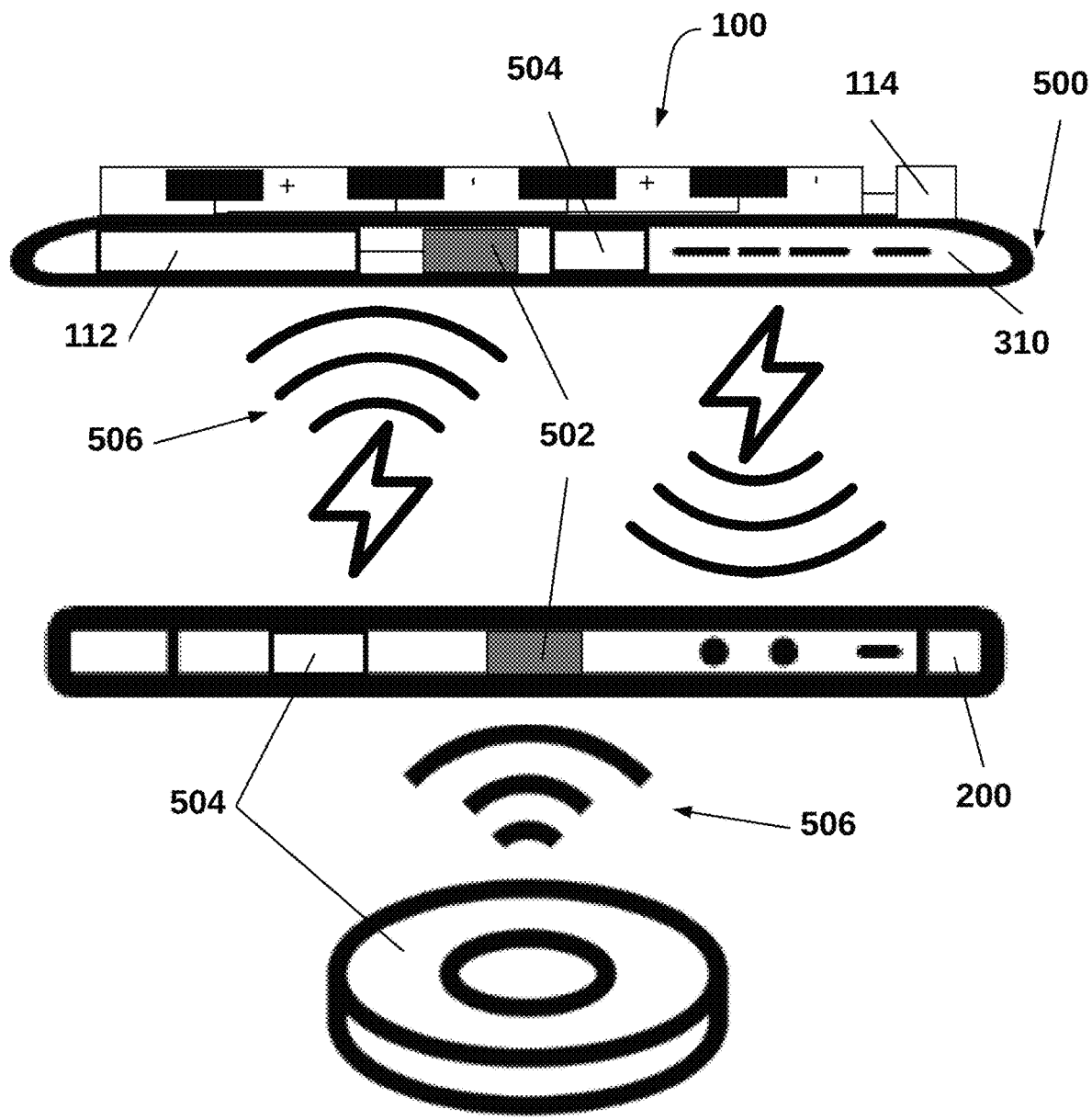
FIG. 5 illustrates an exemplary wireless charging embodiment of the electroadhesion device.

FIG. 5 illustrates an exemplary wireless charging embodiment of the electroadhesion device holder 500. To wirelessly charge a power supply 112 built into a case 310, a charge receiving coil 502 built into the case 310 receives a wireless charging signal 506 (e.g., alternating electromagnetic field or other known wireless charging signal) from an induction coil 504 included in a device 200. The charge receiving coil 502 then converts the wireless charging signal 506 into electricity that is fed to the power supply 112 to charge the power supply 112. Wireless charging of the power supply 112 may eliminate the need for a wired connection between the device 200 and the electroadhesion device holder 500. Including a charge receiving coil 502 in an electroadhesion device holder 500 for a device having an induction coil 504 for wireless charging may also eliminate the need for the device holder to have a communications interface (e.g., USB charging port, micro USB charging port and the like) to support wired charging of the electroadhesion device holder 500.

As shown in FIG. 5, the device 200 may also include a charge receiving coil 502 for receiving a wireless charging signal 506 from a wireless charging device including an induction coil 506. Therefore, the power supply of the device 200 may be wirelessly charged to provide power to an induction coil 504 included in the device 200 that provides a wireless charging signal 506 to a receiving coil 502 in an electroadhesion device holder 500 in order to wirelessly charge the power supply 112 included in the electroadhesion device holder 500. In addition to wireless charging, the charge receiving coil 502 may be used to power the electroadhesion device holder 500 directly without a power supply 112. When coupled to a device 200 having an induction coil 504 or other wireless charging hardware, the electroadhesion device holder 500 may use the wireless charging signal 506 received by the receiving coil to power the electroadhesion device 100. Embodiments of the electroadhesion device holder 500 that use power received by the charge receiving coil 502 to directly power the electroadhesion device holder 500 may not include a power supply 112.

The wireless charging between the electroadhesion device holder 500 and the device 200 may be reversible. The reversible wireless charging embodiment of the electroadhesion device holder 500 may produce a wireless charging signal 506 to charge the device 200. The reversible wireless charging embodiment of the electroadhesion device holder 500 may also have a receiving coil 502 for receiving the wireless charging signal 506 from the device 200 to charge the power supply 112 of the electroadhesion device holder 500. To generate the wireless charging signal 506, the electroadhesion device holder 500 may include an induction coil 504 that provides the wireless charging signal 506 to the receiving coil 502 of the device 200. The induction coil 504 of the electroadhesion device 100 may be used to provide a quick boost of additional battery life to the device 200 and may function as a backup battery in case the battery included in the device 200 runs out.

The reversible wireless charging embodiment of the electroadhesion device holder 500 may include a safety switch that prevents the induction coil 504 and the receiving coil 502 of the electroadhesion device holder 500 from operating simultaneously. The safety switch may prevent the reversible wireless charging embodiment of the electroadhesion device holder 500 from charging wirelessly and providing the wireless charging signal 506 to charge another device at the same time to ensure the wireless charging embodiment of the electroadhesion device 500 operates safely. To enhance safety and prolong battery life, the electroadhesion device holder 500 may begin wirelessly charging only when the electroadhesion device 100 is powered off. The amount of wireless charging time and when the electroadhesion device holder 500 begins wirelessly charging may be controlled automatically. For example, the electroadhesion device holder 500 may charge wirelessly when the electroadhesion device 100 is powered off, the power supply 112 is below a pre-defined percentage charged, the battery of the device 200 is above a pre-defined percentage charged, and the like. The amount of wireless charging time and or the triggers to begin and or end wireless charging may also be set manually by adjusting the settings of the operating system of the device 200 and or by using an application installed on the device 200 that controls the electroadhesion device holder 500.

Figure 6A:
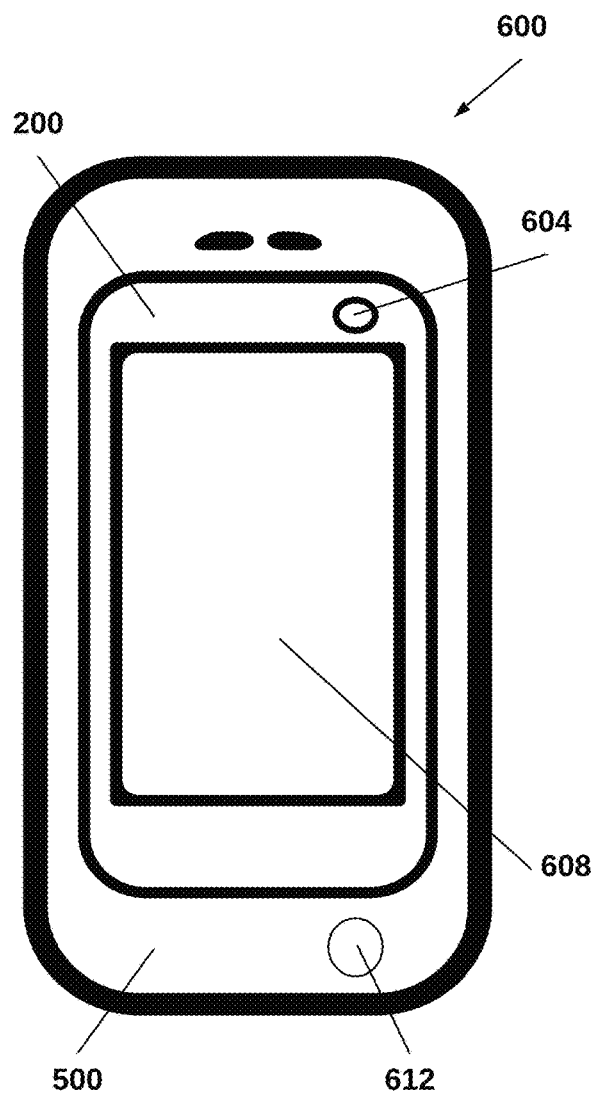
FIGS. 6A-B are each an alternative perspective of the case of FIG. 3.
Figure 6B:
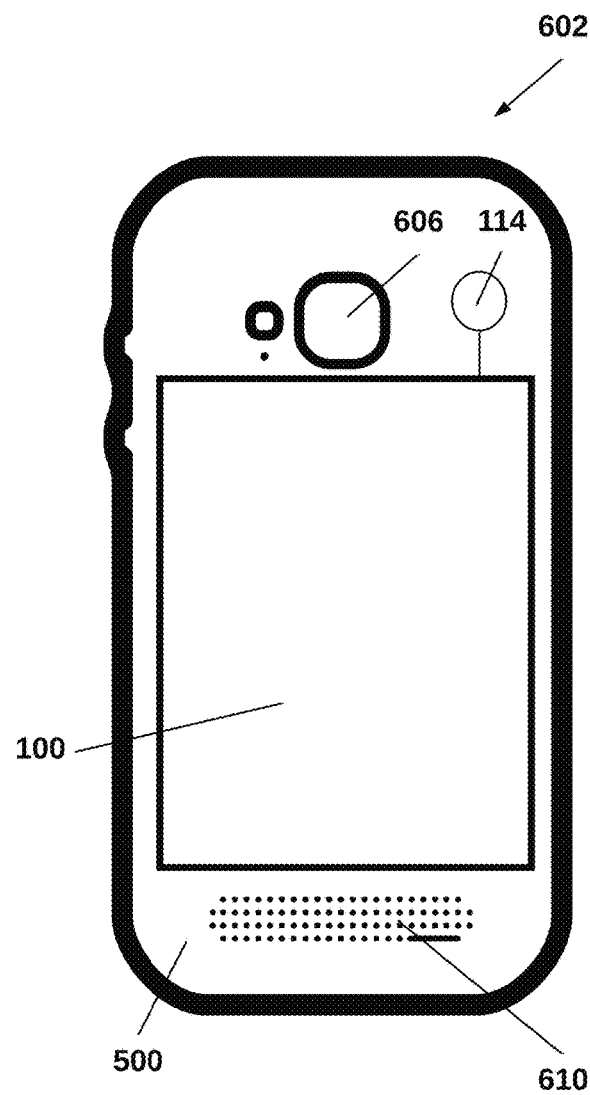

FIGS. 6A-B illustrate a flat front view 600 and a flat back view 602 of an exemplary electroadhesion device holder 500. As shown in FIG. 6A, the electroadhesion device holder 500 may be implemented as a case holding a device 200. In various embodiments, the device may include a front camera 604 and a screen 608 for viewing content. The electroadhesion device 100 may be integrated into the back portion of the electroadhesion device holder 500 as shown in FIG. 6B. This orientation allows the device 200 to be attached to target surface using the electroadhesion device 100. Mounting the device 200 in this orientation allows users to view the device display screen 608 and use the front camera 604 while the device is mounted. To maximize the surface area for attaching the electroadhesion device 100 to a target surface, the electroadhesion device 100 may cover most of the back portion of the electroadhesion device holder 500. In various embodiments, the electroadhesion device 100 may cover the entire back portion of the electroadhesion device holder 500 except areas including a rear camera 606 and/or a hole for letting light pass through to a rear camera 606 and/or speakers/microphones 610 or holes for letting sound pass out from speakers and/or pass through to microphones.

One or more sensors 114 may be attached to the electroadhesion device 100 and a button 612, latch, or other mechanism for actuating the electroadhesion device 100 and/or adjusting the voltage output. The button 612, latch, or other mechanism may be attached to the front of the electroadhesion device holder 500. In various embodiments, a removable cover may be placed over the button 612, latch, or other mechanism. The removable cover may be used to prevent accidentally generating and/or adjusting the voltage output. The removable cover may be used as a safety mechanism in combination with—or in place of—the sensor and digital switch.

Figure 7A:
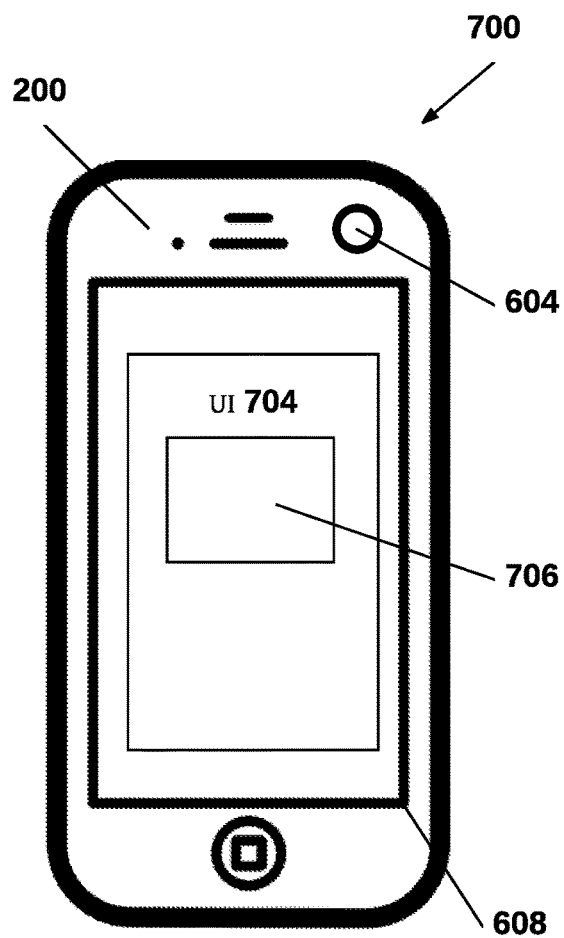
FIGS. 7A-B illustrate an exemplary electroadhesion device integrated into a smartphone.
Figure 7B:
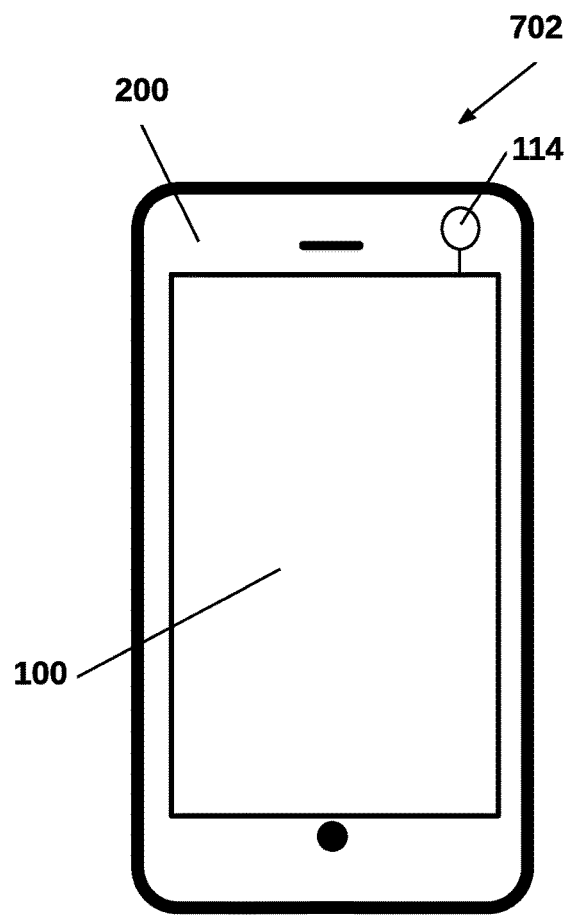

FIGS. 7A-B illustrate a flat front view 700 and a flat back view 702 of a preferred embodiment of an electroadhesion device 100 built into a device 200. As shown in FIG. 7A, the electroadhesion device 100 may be attached directly to a device 200 having a front camera 604 and a display screen 608. The display screen 608 may present one or more UI displays 704 that enable the user to input control commands for operating the electroadhesion device 100. For example, the UI display 704 may include a digital UI element 706 (e.g., a selectable button) that a user may select or otherwise interact with to actuate the electroadhesion device 100 and/or adjust the voltage output. In various embodiments, the device 200 may have an authentication mechanism for authenticating a user of the device 200. For example, the device 200 may have a fingerprint scan, face scan, or other biometric authentication mechanism; a password authentication mechanism; a multifactor authentication mechanism that requires access to another device; and the like. The authentication mechanism of the device 200 may be integrated with the UI display 704 and/or the electroadhesion device 100 to prevent an unauthorized user from accessing the UI display 704 and/or UI element 706 and/or accidentally generating and/or adjusting the voltage output. The authentication mechanism of the device 200 may be used as a safety mechanism in combination with—or in place of— the sensor and digital switch.

FIG. 7B illustrates the electroadhesion device 100 may be attached to the rear portion of the device 200 so that the device 200 may be mounted to a target surface with the display screen 608 and the front camera 604 visible. In various embodiments, the device 200 may be mounted to a target surface some distance away and some distance off the ground using the electroadhesion device 100. Mounting the device 200 to the target surface may improve the perspective for viewing the screen 608 and/or the field of view of the front camera 604. The electroadhesion device 100 may be attached to the device 200 using any known attachment mechanism including a chemical adhesive, a mechanical fastener, a heat fastener (e.g., welded, spot welded, or spot-melted location), dry adhesion, Velcro, suction/vacuum adhesion, magnetic or electromagnetic attachment, tape (e.g.: single- or double-sided), and the like. The electroadhesion device 100 may also include one or more sensors 114 for measuring one or more characteristics of a target surface. Depending on the degree of device portability desired or needed for a given situation and the size of the electroadhesion device 100, the attachment mechanism may create a permanent, temporary, or removable form of attachment.

Figures 8A, 8B:
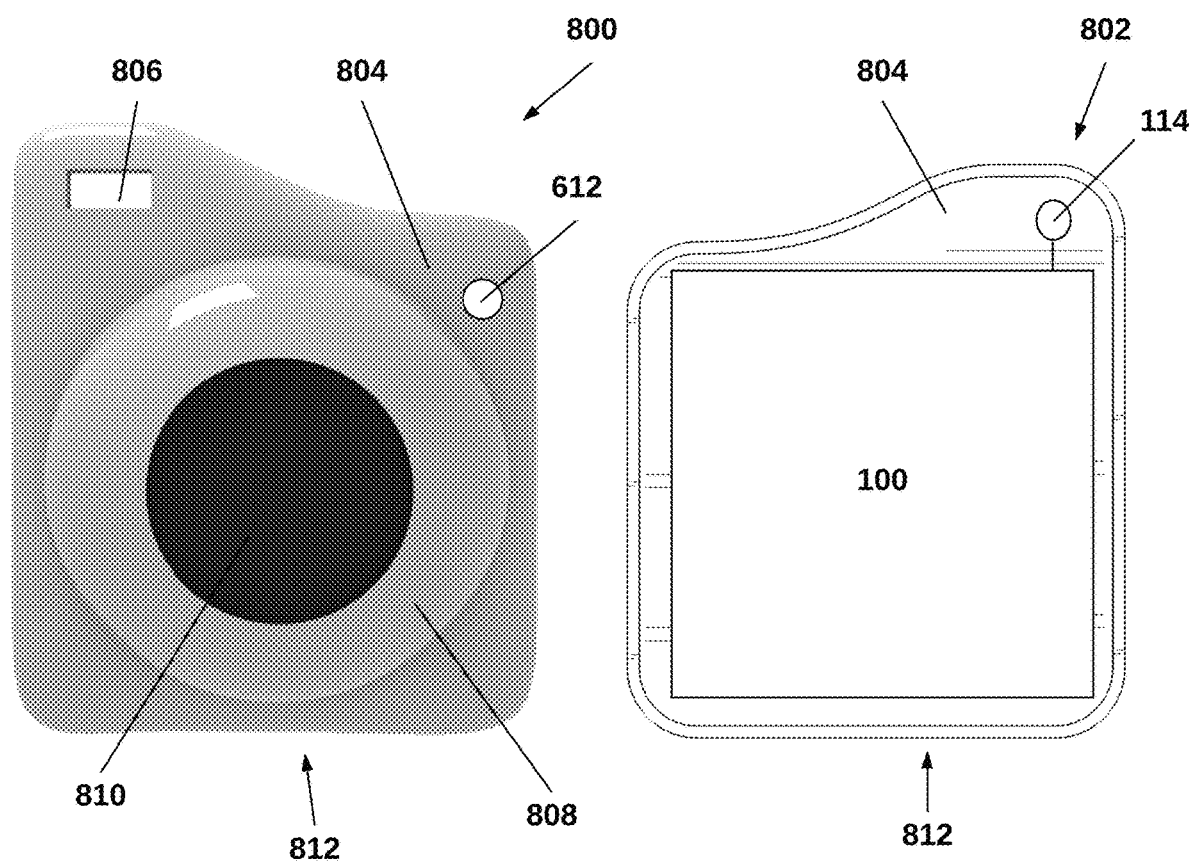
FIGS. 8A-B illustrate an exemplary electroadhesion device integrated into a camera.

FIGS. 8A-B illustrate a flat front view 800 and a flat back view 802 of a preferred embodiment of an electroadhesion device 100 integrated with a camera device 812. As shown in FIG. 8A, the electroadhesion device 100 may be attached directly to a camera device 812 having a housing 804, an eye portion 808, an opening 810, and a LED light 806. The housing 804 may dispose a circuit board including the electrical components (e.g., processor, control circuits, power source, image sensor, and the like) of the camera device 812. The housing 804 may include an eye portion 808 extending laterally out from the surface of the housing 804. The eye portion 808 may dispose one or more camera components (e.g., lens, image sensor, and the like). One end of the eye portion 808 includes an opening 810 to allow light to pass through the lens and reach the image sensor disposed inside the housing 804 and/or eye portion 808. An LED light 806 may be embedded in an exterior surface of the housing 804 to provide additional light (i.e., flash) to enable capture of selfie content in low light conditions.

A button 612, latch, or other mechanism for actuating the electroadhesion device 100 and/or adjusting the voltage output. The button 612, latch, or other mechanism may be attached to the front of the camera device 812. In various embodiments, a removable cover may be placed over the button 612, latch, or other mechanism. The removable cover may be used to prevent accidentally generating and/or adjusting the voltage output. The removable cover may be used as a safety mechanism in combination with—or in place of—the sensor and digital switch.

Figure 9:
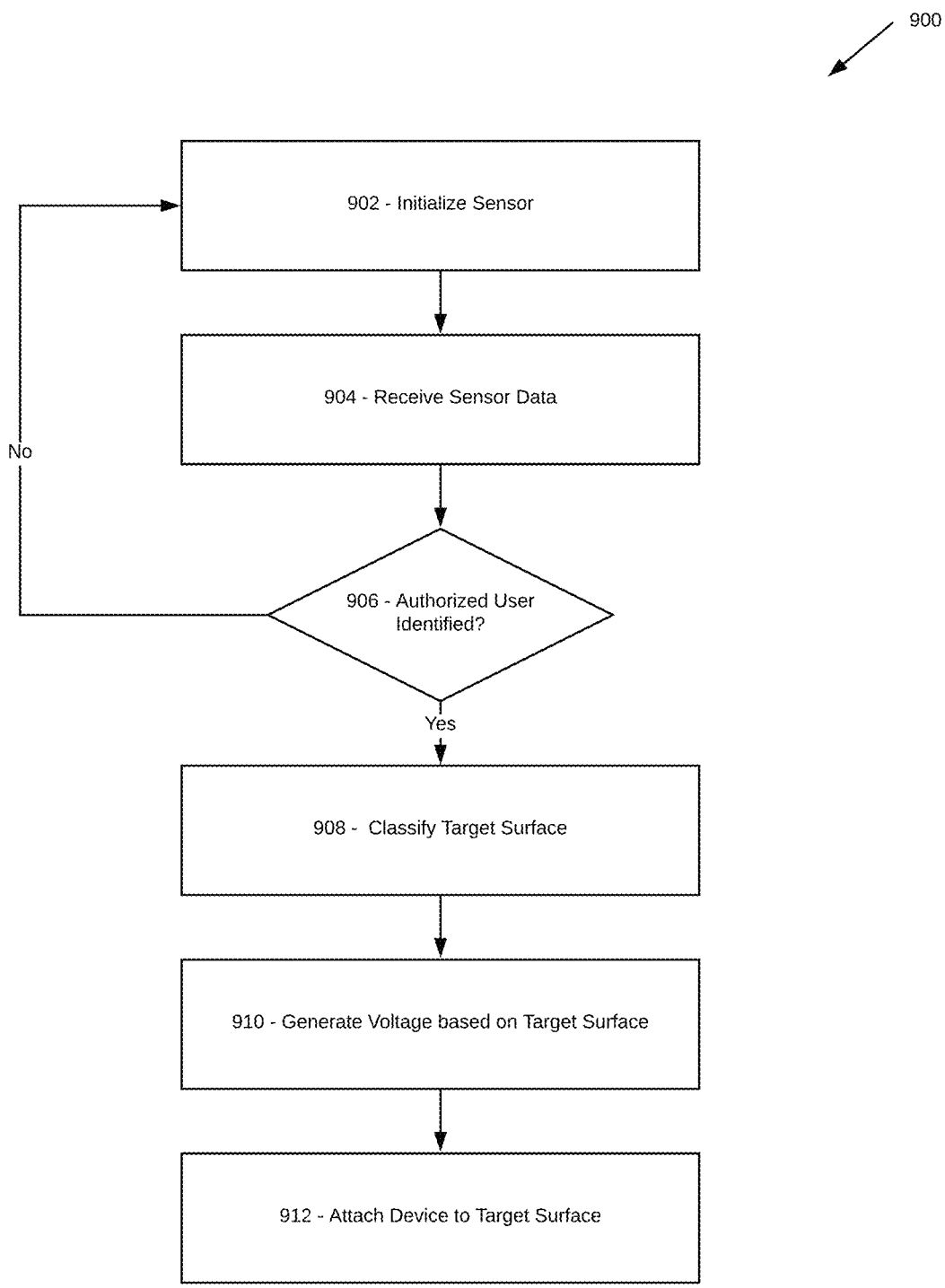
FIG. 9 is a flow chart illustrating an exemplary method of using the digital switch to regulate voltage generated by the electroadhesion device.

FIG. 8B illustrates the electroadhesion device 100 may be attached to the rear portion of the housing 804 so that the camera device 812 may be mounted to a target surface with the eye portion 808 opening 810 unobstructed. In various embodiments, the camera device 812 may be mounted to a target surface some distance away and some distance off the ground using the electroadhesion device 100. One or more sensors 114 may be attached to the electroadhesion device 100 for measuring one or more characteristics of the target surface. In response to sensor data collected by the one or more sensors 114, the voltage generated by the electroadhesion device 100 may be modified to fit the target surface. Mounting the camera device 812 to the target surface may improve the perspective captured by—and/or the field of view of—the camera device 812. The electroadhesion device 100 may be attached to the camera device 812 using any known attachment mechanism including a chemical adhesive, a mechanical fastener, a heat fastener (e.g., welded, spot welded, or spot-melted location), dry adhesion, Velcro, suction/vacuum adhesion, magnetic or electromagnetic attachment, tape (e.g.: single- or double-sided), and the like. Depending on the degree of camera device 812 portability desired or needed for a given situation and the size of the electroadhesion device 100, the attachment mechanism may create a permanent, temporary or even removable form of attachment FIG. 9 is a flow chart illustrating an exemplary method for regulating the voltage generated by an electroadhesion device 900. At 902, one or more sensors included in the electroadhesion device are initialized. In various embodiments, the sensors may be initialized automatically when the electroadhesion device is powered on, directed toward a target surface, moved, or in response to some other triggering event. The sensors may also be initialized in response to a user manually actuating the sensors and/or electroadhesion device by interacting with a mechanical (e.g., button) or digital (e.g., UI element) actuation mechanism.

Once the one or more sensors are initialized, the sensors may collect sensor data. Sensor data from the one or more sensors is received at 904. Sensors may include conductivity sensors (e.g., electrode conductivity sensors, induction conductivity sensors, and the like); Hall effect sensors and other magnetic field sensors; porosity sensors (e.g., time domain reflectometry (TDR) porosity sensors); wave form sensors (e.g., ultrasound sensors, radar sensors, infrared sensors, dot field projection depth sensors, time of flight depth sensors);

motion sensors; and the like. Sensor data may also include image data collected by cameras and other image sensors.

At 906, sensor data may be used to validate a user of the electroadhesion device as an authorized user. To determine if a user is an authorized user, a camera included in the electroadhesion device may capture an image of the user. The image may be transferred to the data analysis module and classified as an authorized user by a machine learning system trained to recognize images of people identified by the owner of the electroadhesion device as authorized users. To detect authorized users, the electroadhesion device may also be integrated with a face scan app (e.g., iOS Face Scan) or other facial scanning technology built into a smart phone or other consumer device integrated with the electroadhesion device. If the data analysis module identifies an authorized user at 906, the sensor and/or data analysis module will classify the target surface at 908. If the data analysis module does not identify an authorized user at 906, the electroadhesion device will terminate one or more processes and/or power down and wait for the sensor to be initialized by an authorized user at 902.

At 908, the sensor and/or data analysis module may classify the target surface by determining one or more characteristics of the target surface using sensor data. For example, sensor data may be used to determine the target surface's conductivity and other electrical or magnetic characteristics; the material's porosity, permeability, surface morphology, hardness, smoothness, and other surface characteristics; and the like. One or more characteristics determined from sensor data may be used to control the digital switch directly to generate voltage based on the target surface at 910. Sensor data may also be sent to a data analysis module. The data analysis module may refine the sensor data and use it to determine a characteristic and/or material type (e.g., metal, wood, plastic, ceramic, concreate, drywall, glass, stone, and the like) for the target surface. The digital switch 116 may then control the voltage output from the voltage converter at 910 based on the characteristic and/or material type for the target surface determined by the data analysis module.

At 910, the digital switch operates the voltage converter to generate voltage based on the target surface. The digital switch may autonomously modify the voltage output of the voltage converter depending on the target surface to eliminate sparks, fires, electric shocks, and other safety hazards that may result from applying too much voltage to a target surface. For example, if a sensor detects a conductive target surface (e.g., metal) the digital switch may operate the voltage converter to generate a low voltage. If the sensor detects an organic target surface (e.g., wood, drywall, fabric, and the like) the digital switch may operate the voltage converter to generate a medium voltage. If the sensor detects a smooth target surface (e.g., glass) or an insulating target surface (e.g., plastic, stone, sheetrock, ceramics, and the like), the digital switch may operate the voltage converter to generate a high voltage.

At 912, once the voltage converter generates a voltage output that is safe to apply to the target surface, the electroadhesion device may be attached to the target surface. To attach the electroadhesion device, the device may be placed into contact with—and/or in close proximity to—the target surface. When the electroadhesion device is moved to a new target surface, the sensor may automatically detect one or more characteristics of the new target surface and classify the new target surface. The digital switch may then modify and/or maintain the voltage output generated by the voltage converter based on the material type and/or characteristics for the new target surface. Additionally, if the sensor detects the electroadhesion device is moved away from a target surface, the digital switch may power down the voltage converter and/or otherwise terminate voltage output from the voltage converter until a new target surface is detected by the sensor.

In the embodiments above, the electro-adhesion device 100 has two or more electrodes 104. The two or more electrodes 104 may all be made from the same material (or a mixture of materials) or some of the electrodes 104 may be made of a different material or mixture of materials. For any one or more (or all) of the electrodes 104 of the electroadhesion device 100 shown in the above Figures, each (or all) of the electrodes may be made of various different materials or a mixture of different materials. For example, each (or all) of the electrodes may be made of (or partially made from) vanadium that is very ductile (can be made very thin without breaking), is a superb electric conductor and does not heat up when current is running through the electrodes. Each (or all) of the electrodes may also be made of (or partially made of) Zirconium, Titanium, Nickel alloy, Carbonate, Xenon and/or Iron. The above materials allow the electroadhesion device to be on and adhering the device 200 (such as a phone, tablet, camera, etc.,) to a surface for an extended period of time (hours) without the electroadhesion device overheating.

In addition to the above materials, each (or all) of the electrodes 104 may also be made of or include Rubidium (that is easily ionized), Selenium (the electrical conductivity of crystalline Selenium due to illumination increases more than 1000 fold such that, for example, the illumination of crystalline selenium for 0.001 second increases its conductivity by a factor of 10 to 15 times), Strontium, Nickel, Chromium-Vanadium steel, and/or Cobalt. In addition, the case for the device may be made of carbonate and silver and/or copper for the best conductivity.

For the electroadhesion devices 100 shown in the above Figures, the device 100 may be designed to handle humid environment since electroadhesion and conductivity in general go down as humidity rises. For example, if a user goes from a very dry California to very humid Miami or Hong Kong, the electroadhesion device 100 would not adhere as well. Thus, the sensors 114 included in each embodiment of the electroadhesion device 100 may include a humidity sensor that measures the humidity in the current environment and then adjusts the voltage needed to adhere to a surface depending on the humidity. For example, the surface sensor described above on the case may sense a "wood" surface and then the humidity sensor would sense X percent humidity. After getting these two pieces of data, the controller of the electroadhesion device 100 may adjust the voltage based on these two variables. In some embodiments, the electroadhesion device 100 may receive these variables and adjust the voltage to ensure adhesion for the particular surface in the particular environment with a particular humidity. The adjustment of the voltage could be preset so that for a wood surface and X percent humidity, the voltage is always adjusted by X percent. Alternatively, the adjustment of the voltage may be algorithmically determined based on the measured surface material and the humidity. For example, surface sensor value+humidity sensor value=voltage adjustment needed for adhesion. As another alternative, the electroadhesion voltage for each surface type may be preset and stored in the electroadhesion device 100 controller and the humidity sensor value may be used to adjust that preset electroadhesion voltage so that a humidity of between X and Y percent may adjust the electroadhesion voltage 10 percent upwards.

The sensors 114 included in the electroadhesion device 100 may also include a heat sensor that measures a temperature of the electroadhesion device 100 and or a temperature adjacent to the electroadhesion device 100. The heat sensor can turn off the electroadhesion device 100 if there is overheating. The heat sensor can also prevent the electroadhesion device 100 from being activated in certain circumstances. For example, if the user just had the case adhered to a surface for a period of time and turned it off, the heat sensor may prevent the electroadhesion device 100 from being reactivated. The heat sensor may also detect an overheat condition from the computing device itself and prevent activation of the electroadhesion device 100. To detect an overheat condition and or determine when to turn off the electroadhesion device 100 and or a voltage converter 108 generating the voltage output produced by the electroadhesion device 100, the digital switch 116 (i.e., controller) may receive the temperature measurement from the heat sensor. The digital switch 116 may then compare the temperature measurement to a high temperature threshold. If the temperature measurement exceeds the high temperature threshold, the digital switch 116 may turn off the electroadhesion device and or voltage converter 108 and or detect an overheat condition. The high temperature threshold may be set to a temperature value that corresponds to a temperature that makes it is unsafe or dangerous to operate the electroadhesion device.

In each of the embodiments described above, the device 200 (i.e., phone, table, camera, etc.) into which the electroadhesion device 100 is integrated or onto which the electroadhesion device 100 is connected may have a camera and may be foldable, such as a foldable computing device or phone. Thus, the electroadhesion device 100 may also be foldable so that the electroadhesion device 100 folds when the foldable computing device or phone folds.

In each of the embodiments described above, the electroadhesion device 100 may include a backup power system if the device 100 stops receiving power or there is some other issue. For example, in addition to using power from the device 200 as described above, the electroadhesion device 100 may have one or more batteries (with one being a backup) so that the electroadhesion device 100 can operate for a period of time independent of the computing device. For example, even if the computing device runs out of power, the electroadhesion device 100 will remain adhered to the surface for some period of time to prevent damage to the device 200.

The foregoing description is intended to convey a thorough understanding of the embodiments described by providing a number of specific exemplary embodiments and details involving electroadhesion device holders. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs.

Methods described herein may represent processing that occurs within a device (e.g., electroadhesion device 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors or microcontrollers, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including, by ways of example, semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

As used herein, the terms "and/or" and "at least one of" include any and all combinations of one or more of the associated listed items.

Certain details are set forth in the foregoing description and in FIGS. 1-9 to provide a thorough understanding of various embodiments of the present invention. Other details describing well-known structures and systems often associated with electroadhesion, mounting systems, user devices, and server devices, etc., however, are not set forth below to avoid unnecessarily obscuring the description of the various embodiments of the present invention.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. An electroadhesion device comprising:
a layer including multiple electrodes;
a power supply connected to the multiple electrodes, wherein the power supply is configured to provide a voltage output to the multiple outputs; and
a surface sensor configured to measure one or more characteristics of a target surface, wherein the voltage output is modified based on the one or more characteristics of a target surface, wherein the voltage output to the multiple electrodes from the power supply causes the multiple electrodes to generate an electroadhesive force that secures the electroadhesion device to the target surface, and wherein the electroadhesive force prevents removal of the electroadhesion device from the target surface.

2. The electroadhesion device of claim 1, wherein the target surface is a table with a substantially flat surface.

3. The electroadhesion device of claim 1, wherein the target surface comprises any of a metal, wood, glass, stone, and/or plastic material.

4. The electroadhesion device of claim 1, wherein the electroadhesion device is connected to a user device, the user device comprising a mobile phone, a tablet, and/or a computer.

5. The electroadhesion device of claim 4, wherein the electroadhesive force prevents unauthorized removal of the user device from the target surface.

6. The electroadhesion device of claim 1, wherein the layer is disposed in an insulating material, the insulating material including a chemical adhesive applied to at least one side of the insulating material.

7. The electroadhesion device of claim 1, further comprising:
a switch in communication with the surface sensor, the switch configured to control the voltage output to the multiple electrodes from the power supply based on the one or more characteristics of the target material.

8. The electroadhesion device of claim 1, further comprising a voltage converter connected to the switch, the voltage converter configured to convert a low voltage from the power supply into the voltage output to the multiple electrodes.

9. The electroadhesion device of claim 1, further comprising:
a camera configured to capture a piece of digital image data of the target surface; and
a computer device including a processor and memory, the memory including instructions executable by the processor configured to:
receive the one or more characteristics of the target surface from the surface sensor;
receive the piece of digital image data from the camera;
classify, using a data analysis module, a material type for the target surface based on the one or more characteristics of the target surface and the piece of digital image data; and
generate instructions for controlling the switch based on the material type.

10. The electroadhesion device of claim 1, further comprising:
a camera configured to capture a piece of digital image data of a user operating the electroadhesion device; and
a computer device including a processor and memory, the memory including instructions executable by the processor configured to:
receive the piece of digital image data from the camera;
detect, using a data analysis module, an unauthorized user based on the piece of digital image data; and
terminate, in response to detecting the unauthorized user, one or more operations of the electroadhesion device to prevent use of the electroadhesion device by the unauthorized user.

11. The electroadhesion device of claim 1, wherein the surface sensor comprises at least one of an electrode conductivity sensor, an induction conductivity sensor, a Hall effect sensor, a magnetic field sensor, a porosity sensor, a time domain reflectometry (TDR) porosity sensor, a motion sensor, an ultrasound sensor, a radar sensor, an infrared sensor, a dot field projection depth sensor, and a time of flight depth sensor.

12. The electroadhesion device of claim 1, wherein the one or more characteristics of the target surface comprises at least one of a conductivity of the target surface, an electrical characteristic of the target surface, a magnetic characteristic of the target surface, a porosity of the target surface, a permeability of the target surface, a surface morphology of the target surface, and distance from the surface sensor to the target surface.

13. A device case removably attached to a user device, the device case comprising;
an electroadhesion device integrated into the device case, wherein the electroadhesion device comprises:
a layer comprising multiple electrodes and an insulating material around the multiple electrodes;
a power supply connected to the multiple electrodes;
a surface sensor configured to measure one or more characteristics of a target surface; and
a switch in communication with the surface sensor, the switch configured to control a voltage output to the multiple electrodes from the power supply based on the one or more characteristics of the target surface, wherein the voltage output to the multiple electrodes from the power supply causes the multiple electrodes to generate an electroadhesive force that secures the electroadhesion device to the target surface and prevents unauthorized removal of the user device and/or device case from the target surface.

14. The device case of claim 13, further comprising an attachment mechanism configured to adhere the electroadhesion device to a surface of the user device.

15. The device case of claim 14, wherein the attachment mechanism includes at least one of a chemical adhesive, a mechanical fastener, a heat fastener, a dry adhesion mechanism, a piece of Velcro, a suction adhesion mechanism, a vacuum adhesion mechanism, a piece of magnetic tape, and a piece of electromagnetic tape.

16. The device case of claim 13, wherein the user device is at least one of a phone, a camera, a personal computer, a laptop, a tablet, and a television.

17. The device case of claim 13, further comprising a receiving coil configured to convert a wireless charging signal into electricity to charge the power supply.

18. A method of regulating voltage generated by an electroadhesion device, the method comprising;
receiving, from a surface sensor, one or more characteristics of a target surface;
determining a voltage output required to adhere the electroadhesion device to the target surface based on the one or more characteristics of the target surface;
generating the voltage output to multiple electrodes from a power supply; and
attaching the electroadhesion device to the target surface using an electroadhesion force between the multiple electrodes and the target surface, wherein the electroadhesion force secures the electroadhesion device to the target surface and prevents unauthorized removal of the electroadhesion device and/or a user device attached to the electroadhesion device from the target surface.

19. The method of claim 18, further comprising ionizing the target surface to create more charged particles in proximity to the electroadhesion device and increase the strength of the electroadhesion force.

20. The method of claim 18, further comprising determining the target surface is conductive based the one or more characteristics of the target surface; and
generating, at the multiple electrodes, a low voltage output that can safely interface with the conductive target surface.

* * * * *